(12) United States Patent
Jain et al.

(10) Patent No.: US 10,345,913 B2
(45) Date of Patent: Jul. 9, 2019

(54) METHOD OF INTERACTING WITH MULTIPLE DEVICES

(71) Applicant: SAMSUNG ELECTRONICS CO., LTD., Suwon-si (KR)

(72) Inventors: Saurabh Jain, Noida (IN); Nishant Bugalia, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 569 days.

(21) Appl. No.: 14/667,194

(22) Filed: Mar. 24, 2015

(65) Prior Publication Data
US 2015/0277574 A1    Oct. 1, 2015

(30) Foreign Application Priority Data
Mar. 28, 2014  (IN) ............... 899/DEL/2014

(51) Int. Cl.
*G06F 3/01* (2006.01)
*G06F 3/0487* (2013.01)
*G06F 3/0486* (2013.01)
*G06F 3/0484* (2013.01)

(52) U.S. Cl.
CPC ............ *G06F 3/017* (2013.01); *G06F 3/0486* (2013.01); *G06F 3/0487* (2013.01); *G06F 3/04842* (2013.01); *G06F 2203/0381* (2013.01)

(58) Field of Classification Search
CPC .... G06F 3/017; G06F 3/04842; G06F 3/0486; G06F 3/0487; G06F 2203/0381
See application file for complete search history.

(56) References Cited

U.S. PATENT DOCUMENTS

| | | | |
|---|---|---|---|
| 8,077,157 B2* | 12/2011 | Sengupta | ............... H04W 4/21 345/173 |
| 8,200,265 B2 | 6/2012 | Carlton et al. | |
| 8,384,665 B1 | 2/2013 | Powers, III et al. | |
| 8,547,342 B2* | 10/2013 | Stallings | ............ G06F 3/04883 345/173 |
| 8,593,398 B2 | 11/2013 | Ollila et al. | |
| 8,629,850 B2* | 1/2014 | Sengupta | ............... H04W 4/21 345/173 |
| 8,717,318 B2* | 5/2014 | Anderson | ............... G06F 3/011 345/173 |
| 8,717,388 B2* | 5/2014 | Matsuda | ............... G06F 3/017 345/633 |
| 8,736,583 B2* | 5/2014 | Anderson | ............... A63F 13/06 345/175 |
| 8,773,512 B1* | 7/2014 | Rafii | ............... G06F 3/017 348/47 |
| 8,819,571 B2* | 8/2014 | Robert | ............... G06F 3/04817 715/769 |

(Continued)

FOREIGN PATENT DOCUMENTS

| | | | |
|---|---|---|---|
| KR | 10-2012-0038788 A | 4/2012 | |
| KR | 10-1234111 B1 | 2/2013 | |

(Continued)

*Primary Examiner* — Peter D McLoone
(74) *Attorney, Agent, or Firm* — Sughrue Mion, PLLC

(57) ABSTRACT

The present disclosure provides a method that allows user to select an object on a first device, select a modification in order to modify the object and transferring information so that the modified object may be displayed on another device.

22 Claims, 18 Drawing Sheets

(56) References Cited

U.S. PATENT DOCUMENTS

| | | | |
|---|---|---|---|
| 8,839,150 B2* | 9/2014 | King | G06F 3/017 |
| | | | 715/836 |
| 8,854,433 B1* | 10/2014 | Rafii | G06F 3/017 |
| | | | 348/42 |
| 8,924,858 B2* | 12/2014 | Mistry | G06F 3/0486 |
| | | | 715/748 |
| 9,152,306 B2* | 10/2015 | Anderson | A63F 13/06 |
| 9,161,166 B2* | 10/2015 | Johansson | G06F 3/0488 |
| 9,332,111 B2* | 5/2016 | Kim | H04M 1/7253 |
| 9,360,933 B2* | 6/2016 | Anderson | A63F 13/06 |
| 9,552,073 B2* | 1/2017 | Liu | G06F 3/017 |
| 9,600,078 B2* | 3/2017 | Rafii | G06F 3/017 |
| 9,639,163 B2* | 5/2017 | Cheng | H04W 4/21 |
| 2009/0140986 A1* | 6/2009 | Karkkainen | G06F 3/0486 |
| | | | 345/173 |
| 2009/0244015 A1* | 10/2009 | Sengupta | H04W 4/21 |
| | | | 345/173 |
| 2010/0156812 A1* | 6/2010 | Stallings | G06F 3/04883 |
| | | | 345/173 |
| 2010/0241998 A1 | 9/2010 | Latta et al. | |
| 2011/0083111 A1* | 4/2011 | Forutanpour | H04W 4/21 |
| | | | 715/863 |
| 2011/0163944 A1* | 7/2011 | Bilbrey | G01D 21/02 |
| | | | 345/156 |
| 2011/0175920 A1* | 7/2011 | Ieperen | G06F 1/1616 |
| | | | 345/473 |
| 2011/0187725 A1* | 8/2011 | Matsuda | G06F 3/017 |
| | | | 345/473 |
| 2011/0193788 A1* | 8/2011 | King | G06F 3/017 |
| | | | 345/173 |
| 2011/0302535 A1 | 12/2011 | Clerc et al. | |
| 2011/0316790 A1* | 12/2011 | Ollila | G06F 3/04883 |
| | | | 345/173 |
| 2012/0084688 A1* | 4/2012 | Robert | G06F 3/04817 |
| | | | 715/769 |
| 2012/0088451 A1* | 4/2012 | Sengupta | H04W 4/21 |
| | | | 455/41.2 |
| 2012/0110470 A1* | 5/2012 | Mistry | G06F 3/0488 |
| | | | 715/748 |
| 2012/0249429 A1 | 10/2012 | Anderson et al. | |
| 2012/0249443 A1* | 10/2012 | Anderson | A63F 13/06 |
| | | | 345/173 |
| 2013/0050080 A1* | 2/2013 | Dahl | G01S 5/18 |
| | | | 345/158 |
| 2013/0097525 A1* | 4/2013 | Kim | H04M 1/7253 |
| | | | 715/748 |
| 2013/0194222 A1 | 8/2013 | Hong et al. | |
| 2013/0226444 A1* | 8/2013 | Johansson | G06F 3/0488 |
| | | | 701/300 |
| 2014/0053079 A1 | 2/2014 | Ollila et al. | |
| 2014/0071069 A1* | 3/2014 | Anderson | A63F 13/06 |
| | | | 345/173 |
| 2014/0125580 A1* | 5/2014 | Eun | G06F 3/017 |
| | | | 345/156 |
| 2014/0149881 A1* | 5/2014 | Cheng | H04W 4/21 |
| | | | 715/748 |
| 2014/0168065 A1* | 6/2014 | Huang | G06F 3/017 |
| | | | 345/156 |
| 2014/0258880 A1* | 9/2014 | Holm | H04L 65/40 |
| | | | 715/748 |
| 2014/0300565 A1* | 10/2014 | Anderson | A63F 13/06 |
| | | | 345/173 |
| 2015/0062004 A1* | 3/2015 | Rafii | G06F 3/017 |
| | | | 345/156 |
| 2015/0095882 A1* | 4/2015 | Jaeger | G06F 8/34 |
| | | | 717/109 |
| 2015/0241987 A1* | 8/2015 | Liu | G06F 3/017 |
| | | | 345/156 |
| 2016/0054809 A1* | 2/2016 | Chang | G06F 3/017 |
| | | | 345/158 |

FOREIGN PATENT DOCUMENTS

| | | |
|---|---|---|
| KR | 10-2013-0061711 A | 5/2013 |
| WO | 2012050377 A2 | 4/2012 |

\* cited by examiner

METHOD OF INTERACTING WITH MULTIPLE DEVICES

CROSS-REFERENCE TO RELATED APPLICATION

This application claims priority from Indian Patent Application No. 899/DEL/2014, filed on Mar. 28, 2014, in the Indian Intellectual Property Office, the disclosure of which is incorporated herein by reference in its entirety.

BACKGROUND

1. Field

Methods and apparatuses consistent with exemplary embodiments generally relate to a method of interacting with multiple devices.

2. Description of Related Art

The following background discussion may be useful in understanding the present disclosure and is not an admission that any of the information provided herein is prior art, or that any publication specifically or implicitly referenced is prior art.

In today's world, it has become more common to interact with one or more devices through air gestures.

Glen, in US 20120249429 A1, describes selection of objects via gestures and transfer of the selected object to another device via gestures. Francois, in US 20110302535 A1, describes a method for selecting a first object in a first virtual environment. Stephen, in US 20100241998, describes methods for selection and manipulation of a virtual object within a virtual space. William, in U.S. Pat. No. 8,384,665 B1, describes techniques for selecting a portion of a 3D virtual environment, in which the portion of the 3D virtual environment may be one or more objects in the 3D virtual environment or a scene of the 3D virtual environment.

While the aforesaid documents describe simple interactions with one or more devices via air gestures, there is an imminent need to provide methods for interacting with multiple devices to enable the user to realize advanced functionalities, wherein the advanced functionalities allow the user to perform tasks other than mere selection of an object and transmission of the selected object.

SUMMARY

According to an aspect of an exemplary embodiment, there is provided a method of controlling a first terminal to provide a modified object, the method including: detecting a first command to select an object; detecting a second command to modify the selected object; modifying the selected object according to the detected second command; and providing the modified object.

The providing the modified object may include transmitting the modified object to a second terminal in response to detecting a third command to transmit the modified object, and the detecting the first command, the detecting the second command and the detecting the third command may be performed by the first terminal.

The modifying the selected object may include transmitting the second command and the selected object to a second terminal in response to detecting a third command to transmit the object. The selected object may be transmitted in an unmodified state with the second command so that the modifying may be performed by the second terminal.

The modifying the selected object may include transmitting the second command and the selected object to a third terminal in response to detecting a third command to transmit the modified object; and modifying the selected object in the third terminal according to the second command. The providing the modified object may include transmitting the modified object from the third terminal to a second terminal and providing the modified object on the second terminal.

The second command may be an air gesture that corresponds to a modification.

In response to the first command selecting a folder on the first terminal, the selecting the object further may include selecting the folder. The modifying of the selected object may include compressing the folder, and the providing the modified object may include providing a compressed file comprising the folder to a second terminal.

In response to the first command selecting a content on the first terminal, the selecting the object may include selecting the content. The modifying of the selected object may include transmitting the selected content to a third terminal in response to a third command to transmit the content and detecting a figure in the content on the third terminal. The providing the modified object may include transmitting the content from which the figure is detected from the third terminal to a second terminal and displaying the content including the detected figure on the second terminal.

In response to the first command selecting a letter displayed on the first terminal, the selecting the object may include selecting the letter. The modifying the selected object may include converting the letter into text data. The providing the modified object may include transmitting the text data to a second terminal so that the text data may be displayed on the second terminal.

According to an aspect of another exemplary embodiment, a method of controlling a second terminal to provide a modified object, includes detecting an air gesture command comprising a first command to select an object displayed by a first terminal and a second command to modify the selected object, transmitting a request to the first device to request the selected object; receiving the selected object; modifying the received object according to the second command; and providing the modified object on the first terminal.

According to an aspect of another exemplary embodiment a system includes: a first terminal configured to provide an object and detect a selection command for selecting the object; a second terminal configured to recognize a user gesture; and a third terminal configured to change the selected object and provide the modified object according to the recognized user gesture.

The first terminal may be configured to store a plurality of objects and detect the selection command to select at least one object from among a plurality of stored objects.

The second terminal may be configured to transmit the recognized user gesture to at least one of the third terminal and the first terminal.

The first terminal may be configured to modify the selected object and transmit the modified object to the third terminal in response to receiving the recognized user gesture from the second terminal.

The first terminal may include the second terminal.

The third terminal may include a display device. The third terminal may be configured to receive a selected object from the first terminal, receive the recognized user gesture from the second terminal and modify the selected object according to the recognized user gesture. The display device may be configured to display the object.

The first terminal may include a display configured to display a folder. In response to detecting a gesture selecting the folder, the first terminal may be configured to compress the folder to a compressed file and transmit the compressed file to the third terminal. The third terminal may be configured to provide the compressed file.

The third terminal may include a display device. The first terminal may be configured to store a content, in response to the gesture selecting the content being received from the second terminal, detect a figure included in the content, and transmit the content and the figure to the third terminal. The display device may be configured to display the content including the figure.

The first terminal may include a first display device and the third terminal may include a second display device. The first terminal may be configured to display a letter on the first display device, convert the letter into a text file in response to the letter being selected, and transmit the text file to the third terminal. The third terminal may be configured to display the text data on the third display device.

The first terminal may include a second display device. The first terminal may be configured to display a folder on the second display device, and in response to detecting a gesture selecting the folder, transmit the folder to a cloud server. The cloud server may be configured to generate a compressed file by compressing the folder, and transmit the generated compressed file to the third device. The display device may be configured to provide the generated compressed file.

The first terminal may be configured to store a content, and in response to detecting a gesture for selecting the content, transmit the content to a cloud server. The cloud server may be configured to detect a figure from the content and transmit the content and the figure to the display device. The display device may be configured to display the content and the figure.

According to an aspect of another exemplary embodiment, there is provided a device for providing a modified object to an external device, the device including: a display configured to display a user interface; a gesture recognizer configured to recognize a selection gesture indicating a portion of the user interface as a selected object and a modification gesture indicating a desired modification to the selected object; a transceiver configured to communicate with the external device; and a controller configured to modify the selected object in accordance with the desired modification and control the transmitter to transmit the modified object to the external device.

According to an aspect of another exemplary embodiment, there is provided a device for providing a modified object received from an external device, the device including: a display configured to display a user interface; a gesture recognizer configured to recognize a selection gesture selecting an object displayed on the external device as a selected object and a modification gesture indicating a desired modification to the selected object; a transceiver configured to communicate with the external device; and a controller configured to control the transceiver to transmit a request to the external device requesting the object and to receive the requested object, and modify the received object in accordance with the desired modification.

According to an aspect of yet another exemplary embodiment, there is provided a method of interacting with a first device and a second device across a cloud computing system, the method including: displaying a graphic user interface comprising a plurality of selectable objects on a first display of the first device; detecting a selection gesture to select one or more of the plurality of selectable objects, the hand gesture detected by an imaging device of the first device; detecting a modification gesture indicating one or more desired modifications to the selected one or more objects by the imaging device of the first device; transmitting the selected one or more objects and the one or more desired modification from the first device to the cloud computing system; receiving the selected one or more objects and the one or more desired modification from the first device at the cloud computing system; modifying the received one or more objects on the cloud computing system in accordance with the one or more desired modifications; transmitting the one or more modified objects from the cloud computing system to the second device; receiving the one or more modified objects from the cloud computing system on the second device; and displaying a graphic user interface comprising the one or more modified objects on a second display of the second device.

To further clarify advantages and features of the present disclosure, a more particular description of the disclosure will be rendered by reference to specific embodiments thereof, which is illustrated in the appended drawings. It is appreciated that these drawings depict only typical embodiments and are therefore not to be considered limiting of its scope. Exemplary embodiments will be described and explained with additional specificity and detail with the accompanying drawings.

BRIEF DESCRIPTION OF THE DRAWINGS

These and other features, aspects, and advantages will become more apparent in light of the following detailed description with reference to the accompanying drawings in which like characters represent like parts throughout the drawings, wherein.

Figure 1:
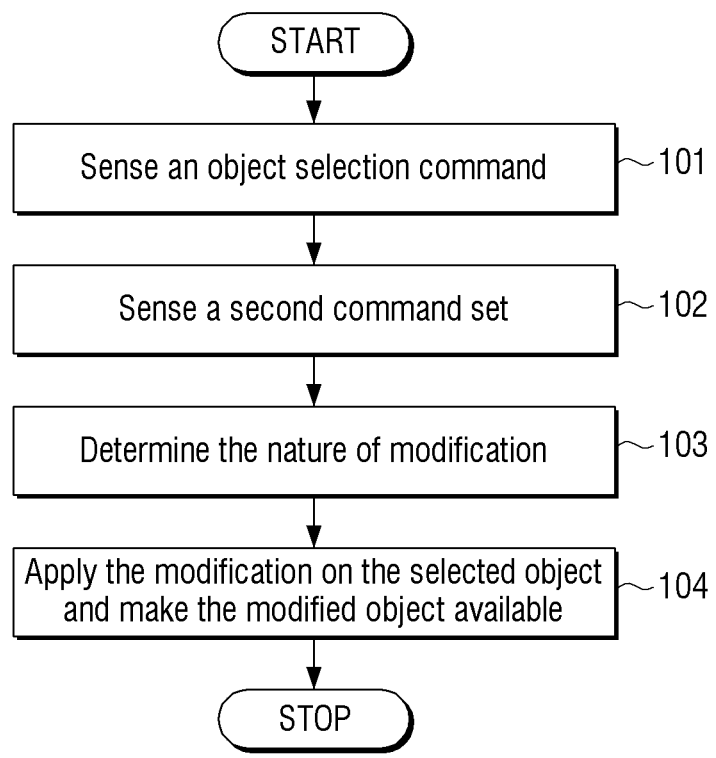
FIG. 1 illustrates a flow diagram for single object modification according to an exemplary embodiment.

Further, skilled artisans will appreciate that elements in the drawings are illustrated for simplicity and may not necessarily be drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as to not obscure the drawings with details that will be readily apparent to those of ordinary skill in the art.

DETAILED DESCRIPTION OF EXEMPLARY EMBODIMENTS

For the purpose of promoting an understanding of the principles of the present disclosure, reference will now be made to exemplary embodiments with reference to the drawings. The particular implementations shown and described herein are illustrative examples, and it will be understood that no limitation of scope is intended. The present disclosure is intended to cover such alterations and further modifications to the illustrated system, and such further applications of the principles of the present disclosure as would normally occur to one skilled in the art.

It will be understood by those skilled in the art that the foregoing general description and the following detailed description are exemplary and not intended to be restrictive.

Reference throughout this specification to "an aspect", "another aspect" or similar language means that a particular feature, structure, or characteristic described in connection with the exemplary embodiment is included in at least one exemplary embodiment. Thus, appearances of the phrase "in an exemplary embodiment", "in another exemplary embodiment" and similar language throughout this specification may, but does not necessarily, refer to the same exemplary embodiment.

The terms "comprises", "comprising", or any other variations thereof, are intended to be non-exclusive, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art. The system, methods, and examples provided herein are illustrative only and are not intended to be limiting.

Exemplary embodiments will be described below in detail with reference to the accompanying drawings.

As stated above, there is a need to provide methods for interacting with multiple device to enable a user to realize advanced functionalities, wherein the advanced functionalities allow the user to perform tasks other than mere selection of an object and transmission of the selected object. Accordingly, the present disclosure provides for methods of interacting with multiple devices. These methods not only enable the user to select an object at a device having the object and transmit the selected object from one device to another device, but also enable the user to modify the selected object, such that the modified object is made available to the user at the other device.

FIG. 1 illustrates the overall process 100 of the method of interaction with multiple devices that enables the user to realize advanced functionalities according to an exemplary embodiment.

As shown in step 101 a first command issued by the user is sensed. The first command is a selection command and is used to select an object at a source device. The first command may be in the form of an air gesture. By way of example, any of the methods described above in the background section can be adopted in this regard. Alternatively, any other process may be used. The term "source device" as used herein is intended to mean the device that initially has the object stored thereon.

Thereafter, in step 102, a second command set is sensed. The second command set includes a command to modify (a third command) and a command for making the modified object available to the user (a fourth command). The second command set may also be in the form of air gesture. It may be noted that the second command set, including the command to modify and the command to make the modified object available to the user, can be in the form of a single gesture over air or a series of gestures over air. If the second command set is in the form of a series of gestures over air, these gestures may be needed to be performed in a particular manner and within a predetermined amount of time. The manner of sensing the second command set can be substantially similar to the manner of sensing the first command.

Once the second command set has been sensed, the nature of modification to be performed on the selected object is determined in step 103 based on the third command. Such determination can be done by correlating the second command set with a predefined set, which may, for example, be stored.

In response to the fourth command, in step 104, the modified object is made available to the user. According to aspects of various exemplary embodiments, the process of making the modified object available may be accompanied by a transfer of the object or the modified object (i.e., transfer of the object either in the modified form or in an unmodified form from a first device to a further device). It may be noted that the object can be visible or not visible during the modification.

In the exemplary embodiment described above, the method of interaction enables the user to select a single object at a source device and transmit the single selected object from the source device to the recipient device, thereby making a single modified object available to the user at the recipient device.

Figure 2:
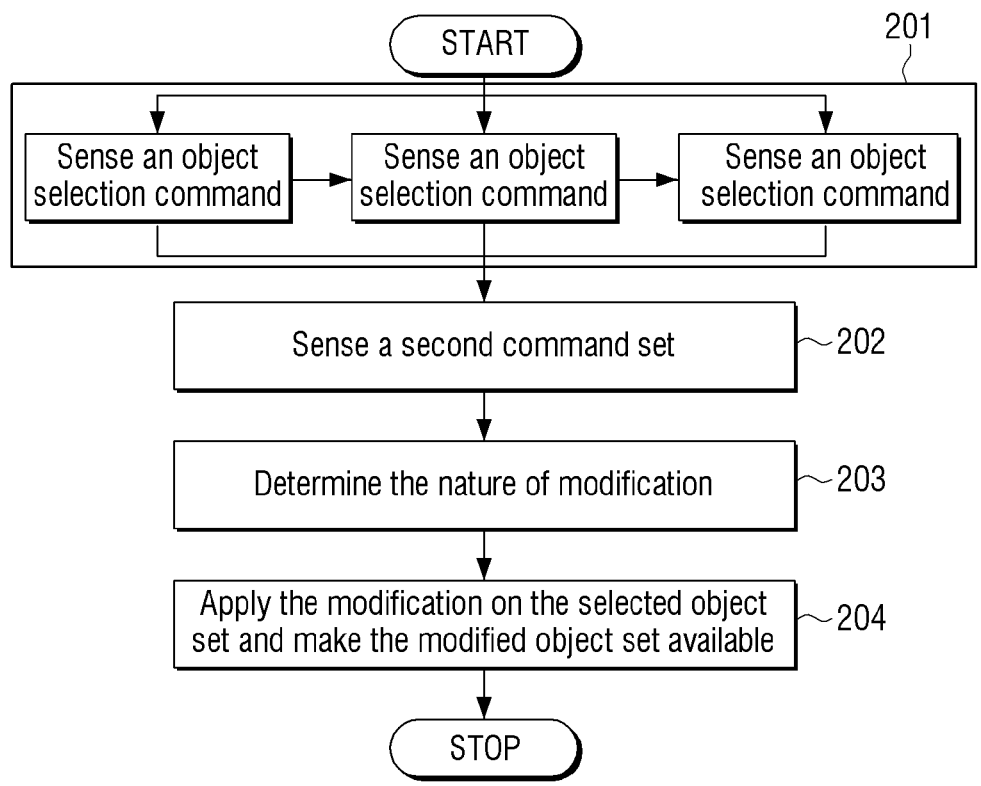
FIG. 2 illustrates a flow diagram for multiple object modification according to another exemplary embodiment.

According to another exemplary embodiment depicted in FIG. 2, the overall process 200 of the method of interaction with multiple devices that enables the user to realize advanced functionalities includes, sensing in step 201 a first command set issued by the user. This first command set may be in the form of an air gesture. The first command set is a selection command and is used to select one or more of a plurality of objects at a source device. For example, as shown in FIG. 2, three objects may be selected. In one exemplary embodiment, the first command set includes a set of first commands, each of which is discrete and is performed within a predetermined amount of time. In other words, a series of selection commands performed within a predetermined amount of time repeatedly can be construed as the first command set. In another exemplary embodiment, the first command set can be in the form of a set of gestures, each of which is sensed prior to sensing of the second command set.

Thereafter, in step 202, a second command set is sensed. The second command set includes a command to modify (a third command) and a command for transfer (a fourth command). The second command set may also be in the form of air gesture. It may be noted that the second command set including the command to modify and the command to transfer can be in the form of a single gesture over air or a series of gestures over air. If the second command set is in the form of a series of gestures over air, the same may be needed to be performed in a particular manner and within a predetermined amount of time. Once again, the manner of sensing the second command set can be substantially similar to the manner of sensing the first command.

Once the second command set has been sensed, the nature of modification to be performed on the selected object is determined in step 203 based on the third command. Such determination can be done by correlating the second command set with a predefined set, that may, for example, be stored.

In response to the fourth command, in step 204, the modified object is made available to the user. According to various aspects of exemplary embodiments, the process of making the modified object available may be accompanied by a transfer of the object or the modified object (i.e., transfer of the object either in the modified form or in an unmodified form from a first device to a further device). It may be noted that the object can be visible or not visible during the modification.

When a plurality of objects are selected in step 201 and second command set including the command to modify is received, one can envisage a scenario wherein one or more of the selected objects may not be adopted to undergo the desired modification. According to an exemplary embodiment, the method can include an additional step of skipping modification of the one or more objects that not adopted to undergo the modification. The method may be further adapted to inform the user of such skips.

Taking into consideration the steps needed to be performed, in order to attain the overall functioning, four basic components are required and the same are:

1. a first component from where the object will be selected;
2. a second component configured to recognize the user gesture;
3. a third component to perform the modification; and
4. a fourth component to transfer the modified object to.

The first component may include one or more devices for storing a plurality of objects object, a selection module for selecting a particular object or a set of objects from a plurality of objects and may optionally include a display.

The second component may include one or more device that will receive and identify the air gesture from user. By way of non-limiting example, the second component may include a gesture recognizer device, a gesture database and a gesture action generation module. The gesture action generation module receives an input from the gesture recognizer device, searches through the gesture database for a gesture action corresponding to the received input and outputs the gesture action. The second component may optionally include a gesture action transmitter for transmitting the gesture action to another device and a display.

The third component performs the gesture processing or modification. By way of a non-limiting example, the third component can be a cloud server, the same device from where the selection was made or any other device. The third component may include a gesture action receiver and an object modification module. The third component may optionally include a transmitter for sending the modified object to a further device and a display.

The fourth component includes one or more devices configured to store the modified object. The fourth component includes a memory for storing the modified object and optionally a receiver for receiving the modified object and a display. Said one or more devices can form part of the first component or the third component or can be any other independent device.

While in the above paragraphs, the overall process has been described, during implementing plurality of scenarios tends to arise that stem from hardware or software capability limitations of the devices. As it could be observed, in case all of the aforesaid four components are forming part of a single device, the user can successfully interact with the same. However, in scenarios wherein all four components are not forming part of a single device, the user has to interact with multiple devices and to attain the advanced functionality.

Because the hardware or software capability may be limited in terms of what components are contained in each of the multiple devices, methods have to be devised to enable the user to interact with the multiple devices, irrespective of their system capability limitations and without deviating from the aforesaid basic construct.

According to a first exemplary embodiment, the present disclosure provides a method of interaction including receiving by a device (first device) a first command set and in response thereto selecting an object set. Additionally, the device (first device) receives a second command indicative of a modification, and in response thereto, modifies the selected object set. The object set may be visible or not visible during the modification.

Figure 3:
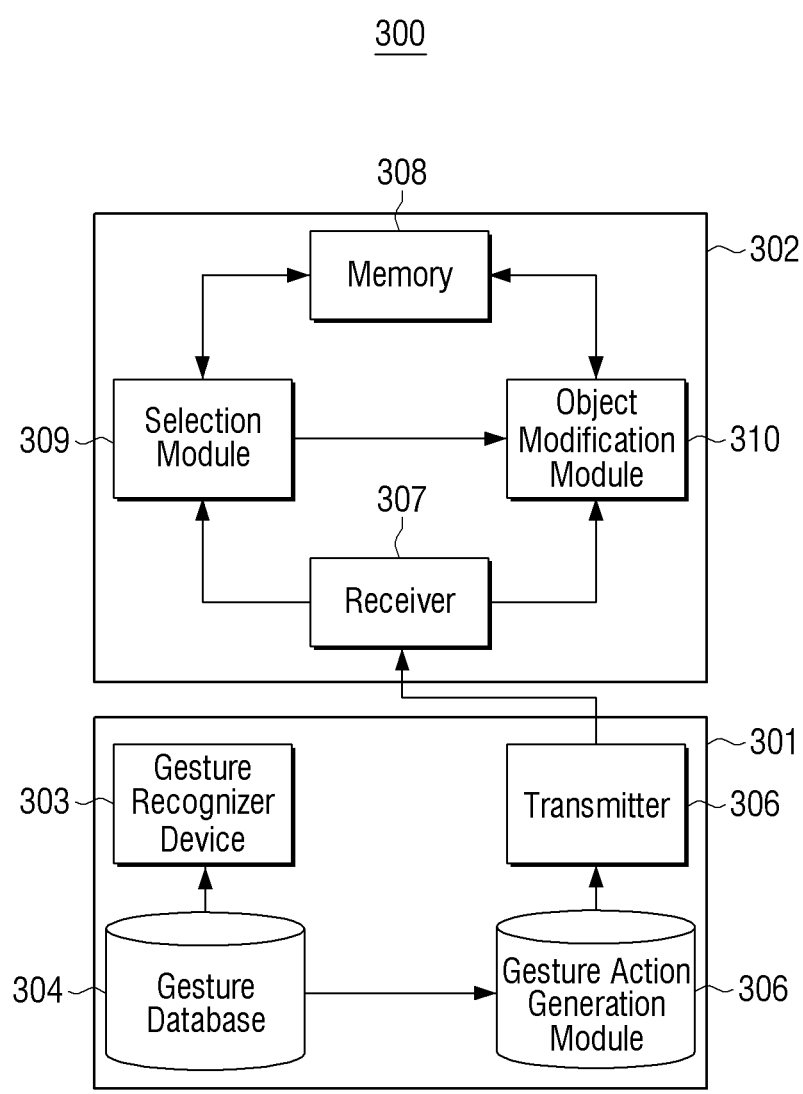
FIG. 3 is a block diagram of a system according to an exemplary embodiment.

Implementation of the aforesaid exemplary embodiment is possible through a system 300 including a first device (301) and a second device (302), as illustrated in FIG. 3. It can be seen that the first device (301) implements the functions of the aforementioned second component while the second device (302) implements the functions of the aforementioned first, third and fourth components.

The first device (301) includes a gesture recognizer device (303), a gesture database (304), a gesture action generation module (305) and a gesture action transmitter (306). The gesture action generation module (305) receives an input from the gesture recognizer device (303), and searches through the gesture database (304) for a gesture action corresponding to the received input and provides the gesture action as its output, e.g., to the gesture action transmitter (306).

In this particular exemplary implementation, the second device (302) includes a gesture receiver (307) that is operably connected to the first device (301) for receiving the gesture actions. The second device (302) further includes a memory (308) storing a plurality of objects. The second device (302) further includes a selection module (309) for selecting a particular object or a set of objects from the plurality of objects thus stored in the memory (308). The second device (302) further includes an object modification module (310), that receives the selected object from the selection module (309) and the gesture action from the gesture receiver (307) and processes the selected object to generate the modified object. The object modification module (310) is adapted to store the modified object in the memory (308).

According to a second exemplary embodiment, the present disclosure provides a method of interaction including sensing by a device (first device) a first command set, and in response thereto, selecting an object set. Additionally, the device (first device) also senses a second command set including a third command indicative of a modification, and a fourth command indicative of transmission. In response to the third and fourth command, the first device modifies and transmits the selected object set. The object set may be either visible or not visible during the modification.

Figure 4:
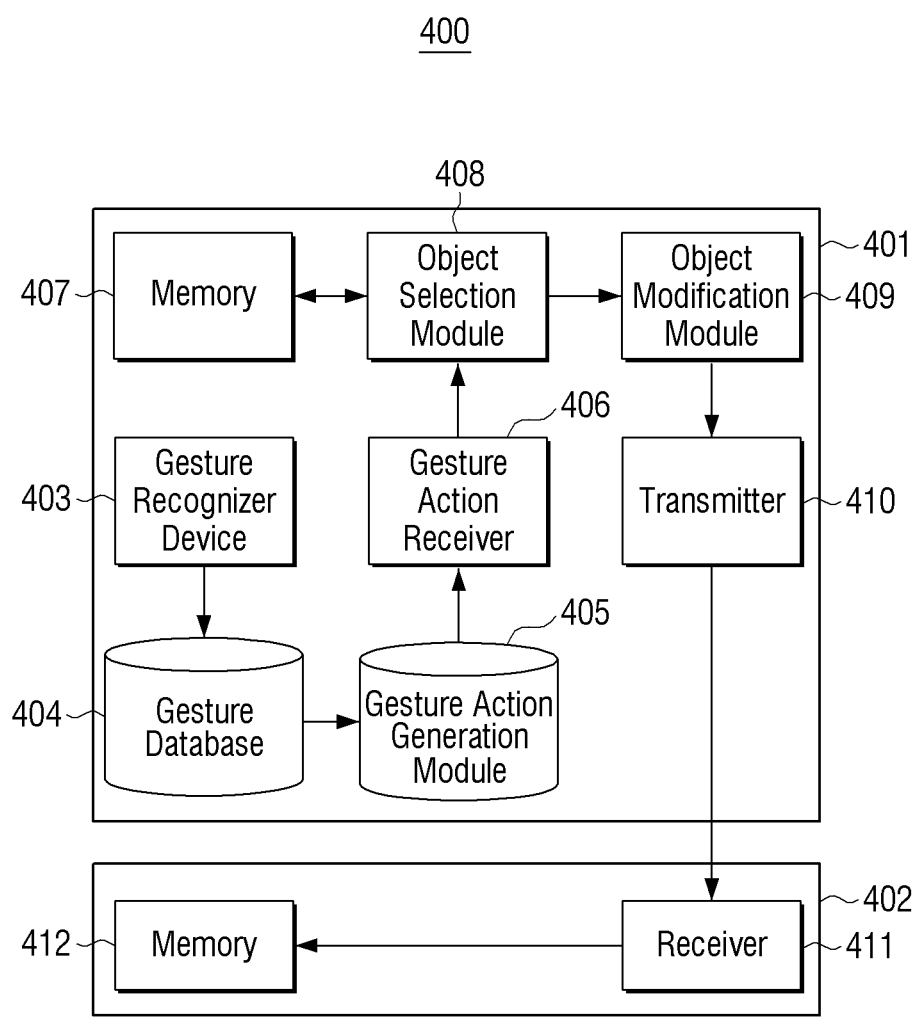
FIG. 4 is a block diagram of a system according to another exemplary embodiment.

Implementation of the aforesaid exemplary embodiment is possible in a system 400 including a first device (401) and a second device (402), as illustrated in FIG. 4. It can be seen that the first device (401) implements the functions of the aforementioned first, second and third components while the second device (402) implements the functions of the aforementioned fourth component.

The first device (401) includes a gesture recognizer device (403), a gesture database (404) and a gesture action generation module (405), wherein the gesture action generation module (405) receives an input from the gesture recognizer device (403), and searches through the gesture database (404) for a gesture action corresponding to the received input and provides the gesture action as its output.

Additionally, the first device (401) includes a gesture receiver (406) that receives the gesture actions. The first device (401) further includes a memory (407) storing a plurality of objects. The first device (401) further includes a selection module (408) for selecting a particular object or a set of objects from the plurality of objects thus stored in the memory (407). The first device (401) further includes an object modification module (409), that receives the selected object from the selection module (408) and the gesture action from the gesture receiver (406) and processes the selected object to generate the modified object. The object modification module (409) is operably connected to a modified object transmitter (410) for sending the modified object to the second device (402).

The second device (402) includes a modified object receiver (411) that is operably connected to the first device (401) and a memory (412) for storing the modified object.

According to a third exemplary embodiment, a method of interaction includes sensing by a device (first device) a first command set, and in response thereto, selecting an object set. Additionally, the device (first device) senses a second command set including a third command indicative of a modification and a fourth command indicative of transmission. In response to the third and fourth command, the first device transmits the object set along with the second command of modification to a further device (either the second device or the third device). The object set may be visible or not visible during the modification.

As a further extension of the aforesaid exemplary embodiment, the method of interaction includes receiving at a device (second device) a selected object set along with a command indicative of a modification of the received object set. The received object set is modified in accordance with the received command of modification, and thereafter stored on the second device. The object set may be visible or not visible during the modification.

Figure 5:
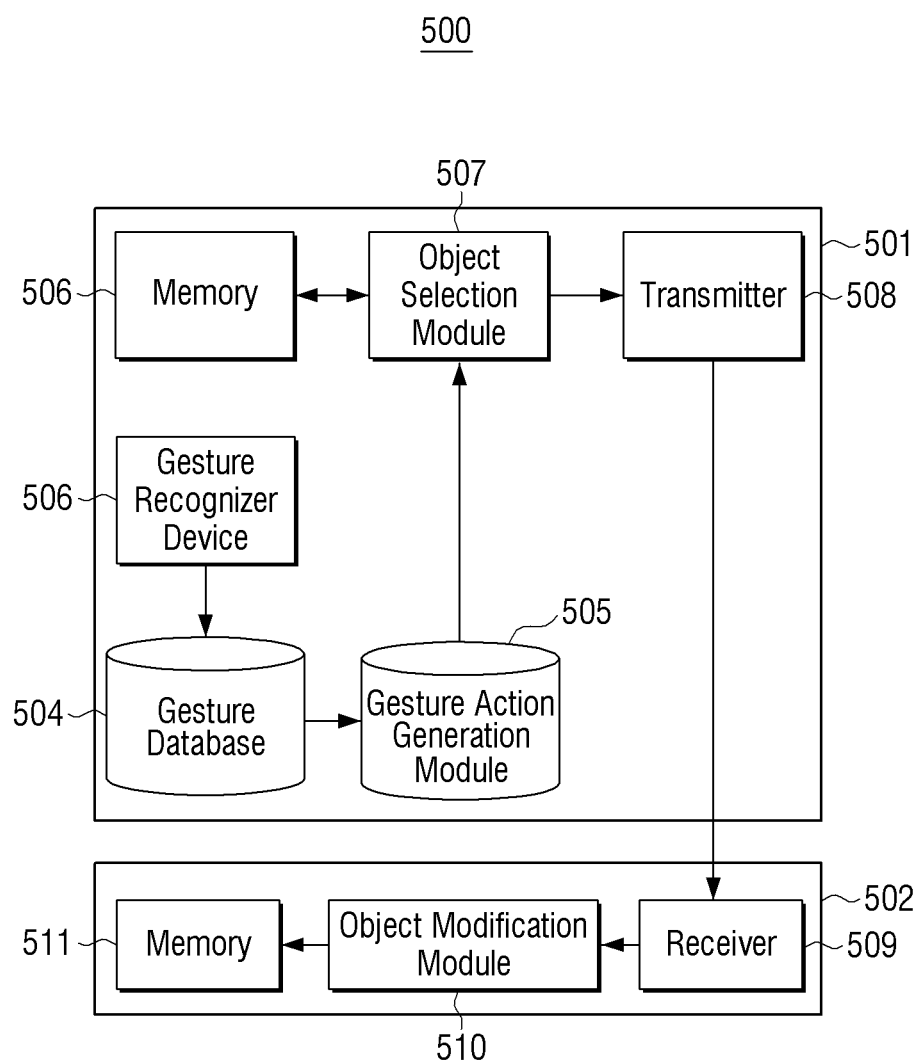
FIG. 5 is a block diagram of a system according to yet another exemplary embodiment.

Implementation of the aforesaid exemplary embodiment is possible in a system 500, including a first device (501) and a second device (502), as illustrated in FIG. 5. It can be seen that the first device (501) implements the functions of the aforementioned first and second components while the second device (502) implements the functions of the aforementioned third and fourth components.

The first device (501) includes a gesture recognizer device (503), a gesture database (504), a gesture action generation module (505). The gesture action generation module (505) receives an input from the gesture recognizer device (503), and searches through the gesture database (504) for a gesture action corresponding to the received input and provides the gesture action as its output. The first device (501) further includes a memory (506) storing a plurality of objects. The first device (501) further includes a selection module (507) operably connected to the gesture action generation module (505) for selecting a particular object or a set of objects from the plurality of objects thus stored in the memory (506). The first device (501) further includes a transmitter (508) for transmitting the selected object or selected set of objects along with the gesture action to the second device (502).

In this particular exemplary implementation, the second device (502) includes a receiver (509) that is operably connected to the first device (501) for receiving therefrom the gesture actions and the selected object (or selected set of objects).

The second device (502) further includes an object modification module (510), that receives the selected object and the gesture action from the receiver (509) and processes the selected object to generate the modified object. The object modification module (510) is adapted to store the modified object in the memory (511) contained in the second device (502).

According to a fourth exemplary embodiment, a method of interaction includes receiving at a device (third device) a selected object set along with a command indicative of a modification of the received object set. Thereafter, the device (third device) modifies the received object set in accordance with the received command. The modified object set is transmitted by the device (third device) to a further device (second device) for storing thereupon. The object set may be visible or not visible during the modification.

Figure 6:
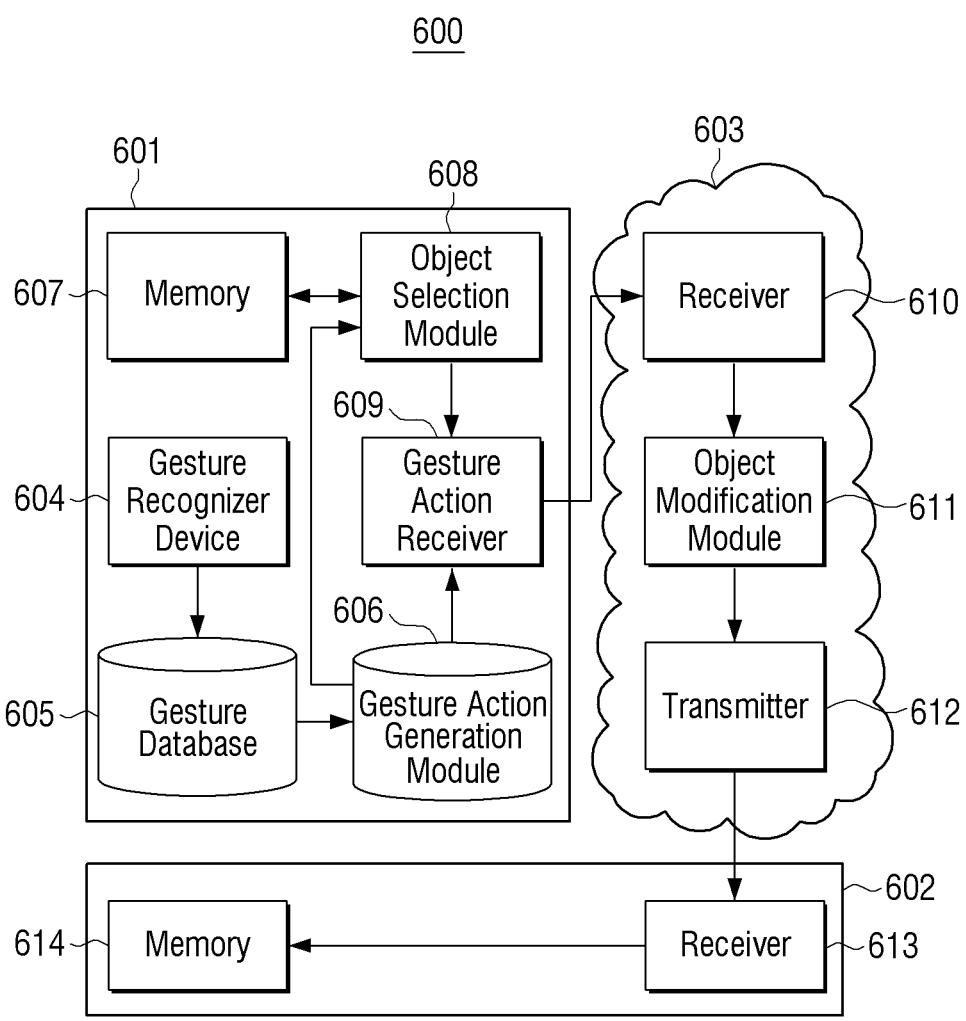
FIG. 6 is a block diagram of a system according to another exemplary embodiment.

Implementation of the aforesaid exemplary embodiment is possible in a system 600 including a first device (601), a second device (602) and a third device (603), as illustrated in FIG. 6. It can be seen that the first device (601) implements the functions of the aforementioned first and second components while the second device (602) implements the functions of the aforementioned fourth component and the third device (603) implements the functions of the aforementioned third component.

The first device (601) includes a gesture recognizer device (604), a gesture database (605) and a gesture action generation module (606). The gesture action generation module (606) receives an input from the gesture recognizer device (604), and searches through the gesture database (605) for a gesture action corresponding to the received input and provides the gesture action as its output. The first device (601) further includes a memory (607) storing a plurality of objects. The first device (601) further includes a selection module (608) operably connected to the gesture action generation module (606) for selecting a particular object or a set of objects from the plurality of objects thus stored in the memory (607). The first device (601) further includes a transmitter (609) for transmitting the selected object or selected set of objects along with the gesture action to the third device (603).

In this particular exemplary implementation, the third device (603) includes a receiver (610) that is operably connected to the first device (601) for receiving therefrom the gesture actions and the selected object (or selected set of objects). The third device (603) further includes an object modification module (611), that receives the selected object and the gesture action from the receiver (610) and processes the selected object to generate the modified object. The object modification module (611) is operably interconnected to a transmitter (612) for transmitting the modified object to the second device (602).

The second device (602) includes a receiver (613) that is operably connected to the third device (603) for receiving therefrom the modified object and a memory (614) for storing the modified object thus received.

According to a fifth exemplary embodiment, a method of interaction, includes sensing by a device (first device) a first command set and in response thereto selecting an object set. Additionally, the device (first) senses a second command set including a third command indicative of a modification and a fourth command indicative of transmission. In response to the third and fourth command, the device transmits the selected object set to a further device (second device).

As a further extension of the aforesaid exemplary embodiment, the method of interaction includes receiving at a device (second device) a selected object set. Additionally, the device (second device) senses a command indicative of a modification of the received object set. In response to the said command, the device (second device) modifies the received object set and stores the modified object set at the device (second device). The object set may be visible or not visible during the modification.

Figure 7:
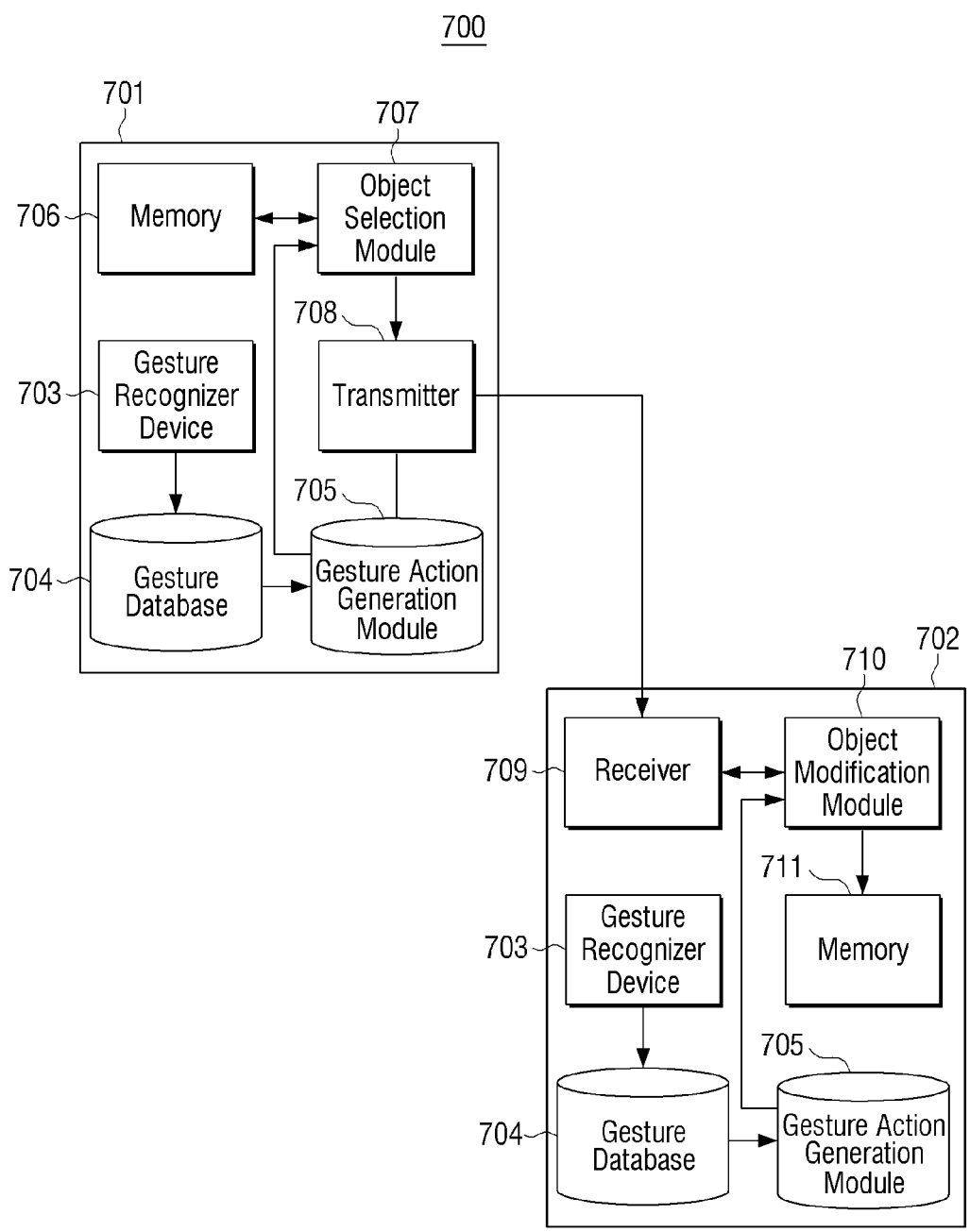
FIG. 7 is a block diagram of a system according to still another exemplary embodiment.

Implementation of the aforesaid exemplary embodiment is possible in a system 700 including a first device (701) and a second device (702), as illustrated in FIG. 7. It can be seen that the first device (701) implements the functions of the aforementioned first and second components while the second device (702) implements the functions of the aforementioned first, third and fourth components. In this case, a partial overlap is observed, as both of the first and the second devices implement the functions of the first component.

The first device (701) includes a gesture recognizer device (703), a gesture database (704), a gesture action generation module (705). The gesture action generation module (705) receives an input from the gesture recognizer device (703), and searches through the gesture database (704) for a gesture action corresponding to the received input and provides the gesture action as its output. The first device (701) further includes a memory (706) storing a plurality of objects. The first device (701) further includes a selection module (707) operably connected to the gesture action generation module (705) for selecting a particular object or a set of objects from the plurality of objects thus stored in the memory (706). The first device (701) further includes a transmitter (708) for transmitting the selected object or selected set of objects. Contrary to the functioning described with reference to FIG. 5, in the present exemplary embodiment, the first device (701) need not transmit the gesture action to the second device (702).

In this particular exemplary implementation, the second device (702) includes a receiver (709) that is operably connected to the first device (701) for receiving therefrom the selected object (or selected set of objects). The second device (702) includes a gesture recognizer device (703), a gesture database (704) and a gesture action generation module (705). The gesture action generation module (705) receives an input from the gesture recognizer device (703), and searches through the gesture database (704) for a gesture action corresponding to the received input and provides the gesture action as its output. The second device (702) further includes an object modification module (710), that receives the selected object from the receiver (709) and the gesture action generation module (705) located within the second device (702) and processes the selected object to generate the modified object. The object modification module (710) is adapted to store the modified object in the memory (711) contained in the second device (702).

According to a sixth exemplary embodiment, a method of interaction, includes receiving at a device (second device) a selected object set. The device (second device) senses a command indicative of a modification of the received object set. In response to this, the second device transmits the received object set and the command of modification to a further device (third device). Finally, the device (second device) stores the modified object set received from the further device. The object set may be visible or not visible during the modification.

Figure 8:
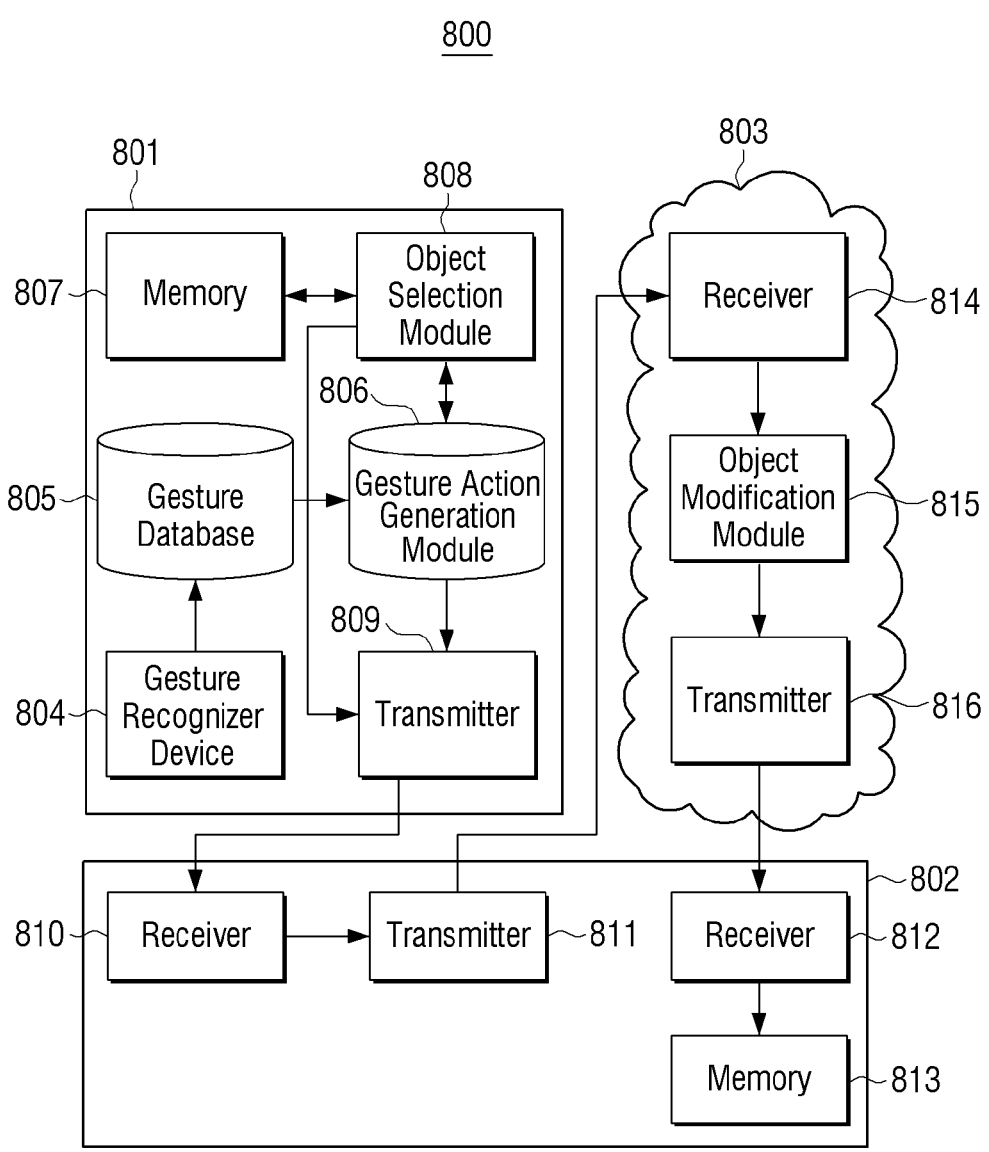
FIG. 8 is a block diagram of a system according to an exemplary embodiment.

Implementation of the aforesaid exemplary embodiment is possible in a system 800 including a first device (801), a second device (802) and a third device (803), as illustrated in FIG. 8. It can be seen that the first device (801) implements the functions of the aforementioned first and second components, while the second device (802) implements the functions of the aforementioned fourth component, and the third device (803) implements the functions of the aforementioned third component. As compared to the exemplary embodiment described with reference to FIG. 6 (wherein the first device had direct access to the third device), in this exemplary embodiment, the first device does not necessarily have direct access to the third device.

The first device (801) includes a gesture recognizer device (804), a gesture database (805) and a gesture action generation module (806). The gesture action generation module (806) receives an input from the gesture recognizer device (804), and searches through the gesture database (805) for a gesture action corresponding to the received input and provides the gesture action as its output. The first device (801) further includes a memory (807) storing a plurality of objects. The first device (801) further includes a selection module (808) operably connected to the gesture action generation module (806) for selecting a particular object or a set of objects from the plurality of objects thus stored in the memory (807). The first device (801) further includes a transmitter (809) for transmitting the selected object or selected set of objects along with the gesture action to the second device (802).

The second device (802) includes a receiver (810) that is operably connected to the first device (801) for receiving therefrom the selected object and the gesture actions and a transmitter (811) that is operably connected to the third device (803) for transmitting to the third device the selected object and the gesture actions as received from the first device (801). The second device (802) additionally includes a receiver (812) that is operably connected to the third device (803) for receiving therefrom the modified object and a memory (813) for storing the received modified object.

In this particular exemplary implementation, the third device (803) includes a receiver (814) that is operably connected to the second device (802) for receiving therefrom the gesture actions and the selected object (or selected set of objects). The third device (803) further includes an object modification module (815), that receives the selected object and the gesture action from the receiver (814) and processes the selected object to generate the modified object. The object modification module (815) is operably interconnected to a transmitter (816) for transmitting the modified object to the second device (802).

According to a seventh exemplary embodiment, a method of interaction includes receiving at a device (third device) a selected object set from a further device (first device). Thereafter, the device (third device) receives a command indicative of a modification of the received object set from a furthermore device (second device). In response to receiving the command, the device (third device) modifies the received object set. The object set may be visible or not visible during the modification.

Figure 9:
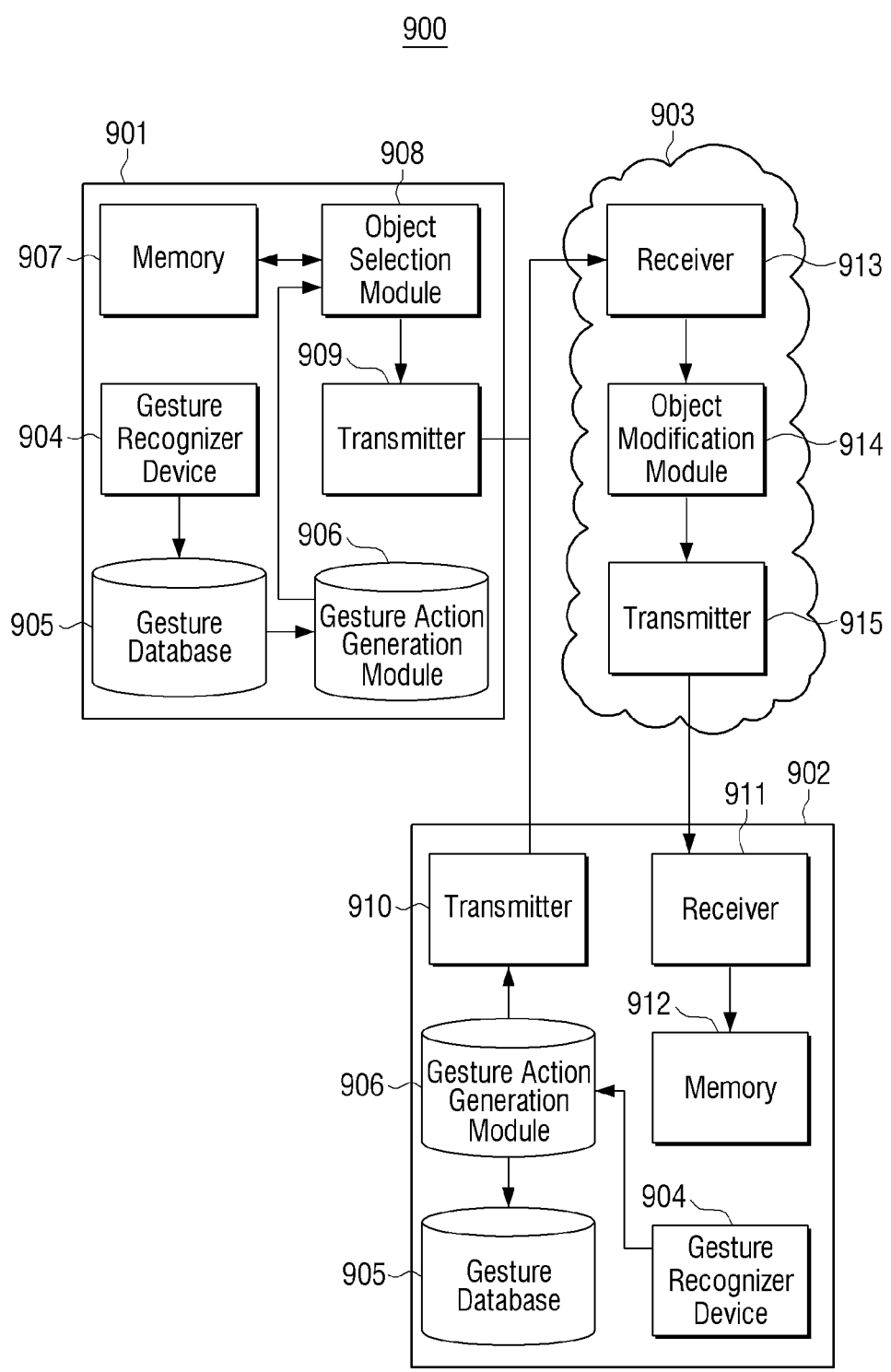
FIG. 9 is a block diagram of a system according to yet another exemplary embodiment.

Implementation of the aforesaid exemplary embodiment is possible in a system 900 including a first device (901), a second device (902) and a third device (903), as illustrated in FIG. 9. It can be seen that the first device (901) implements the functions of the aforementioned first and second components while the second device (902) implements the functions of the aforementioned first and fourth components and the third device (903) implements the functions of the aforementioned third component.

The first device (901) includes a gesture recognizer device (904), a gesture database (905) and a gesture action generation module (906). The gesture action generation module (906) receives an input from the gesture recognizer device (904), and searches through the gesture database (905) for a gesture action corresponding to the received input and provides the gesture action as its output. The first device (901) further includes a memory (907) storing a plurality of objects. The first device (901) further includes a selection module (908) operably connected to the gesture action generation module (906) for selecting a particular object or a set of objects from the plurality of objects thus stored in the memory (907). The first device (901) further includes a transmitter (909) for transmitting the selected object or selected set of objects to the third device (903).

The second device (902) includes a gesture recognizer device (904), a gesture database (905) and a gesture action generation module (906). The gesture action generation module (906) receives an input from the gesture recognizer device (904), and searches through the gesture database (905) for a gesture action corresponding to the received input and provides the gesture action as its output. The second device (902) further includes a transmitter (910) for transmitting the gesture action to the third device (903). The second device (902) further includes a receiver (911) that is operably connected to the third device (903) for receiving therefrom the modified object and a memory (912) for storing the received modified object.

In this particular exemplary implementation, the third device (903) includes a receiver (913) that is operably connected to the first device (901) for receiving therefrom the selected object (or selected set of objects) and to the second device (902) for receiving therefrom the gesture actions. The third device (903) further includes an object modification module (914), that receives the selected object and the gesture action from the receiver (913) and processes the selected object to generate the modified object. The object modification module (914) is operably interconnected to a transmitter (915) for transmitting the modified object to the second device (902).

In this exemplary embodiment, the modified object is stored at the first device (901) instead of the second device (902), the transmitter (915) of the third device (903) can be operably interconnected with the first device (901), in which case, the first device (901) can further contain a receiver and the memory and receiver (911) and the memory (912), as indicated to be contained by the second device (902), is no longer required and can be removed.

According to an eighth exemplary embodiment, a method of interaction, includes sensing by a device (second device) a first command set, and in response thereto selecting an object set at a further device (first device). Additionally, the device (second device) senses a second command set including a third command indicative of a modification and a fourth command indicative of transmission. In response thereto the second device obtains the selected object set from the further device (first device) and modifies the obtained object set. The object set may be visible or not visible during the modification.

Figure 10:
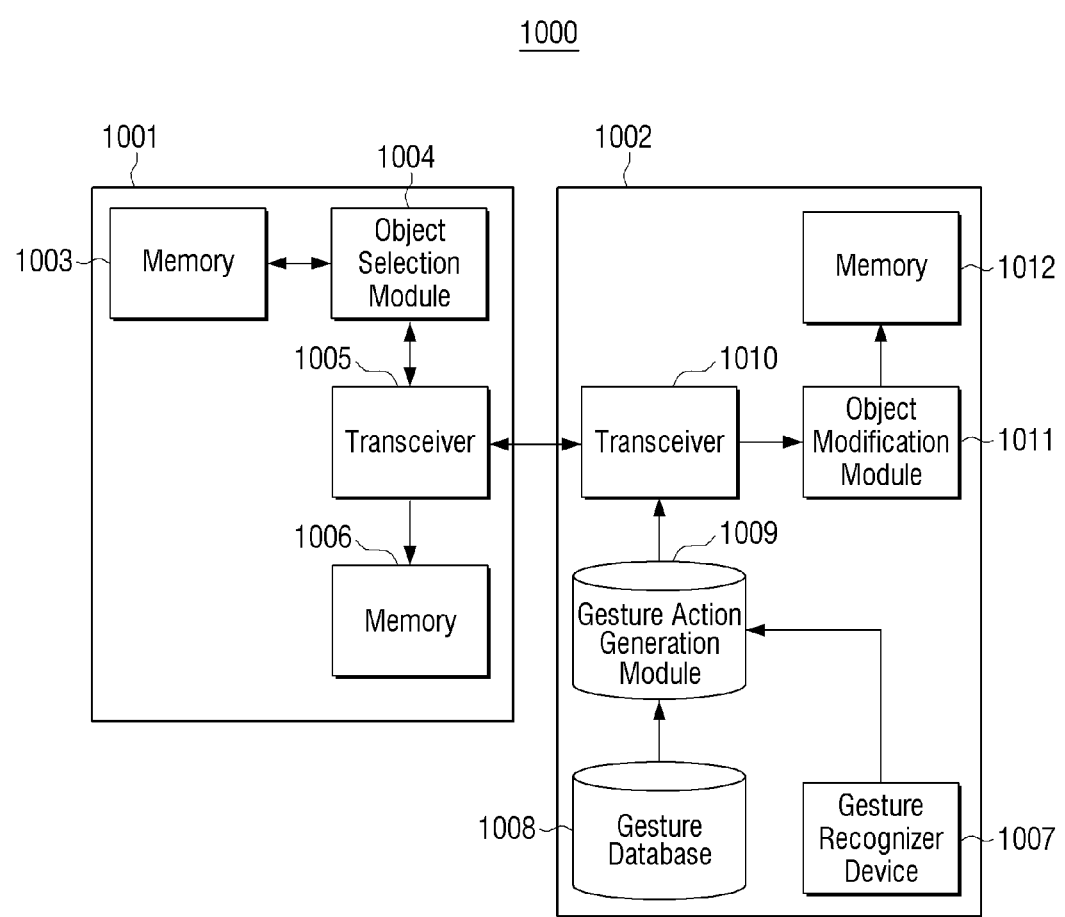
FIG. 10 is a block diagram of a system according to still another exemplary embodiment.

Implementation of the aforesaid exemplary embodiment is possible in a system 1000 including a first device (1001) and a second device (1002), as illustrated in FIG. 10. It can be seen that the first device (1001) selects a particular object (or a set of objects) from a plurality of objects. The second device (1002) essentially implements the functions of the aforementioned first and the third components.

The first device (1001) includes a memory (1003) storing a plurality of objects and a selection module (1004) for selecting a particular object or a set of objects from the plurality of objects thus stored in the memory (1003). The first device (1001) further includes a transceiver (1005) operably interconnected to the second device (1002) for receiving therefrom the selection command and sending the selected object to the second device (1002). In this exemplary embodiment, the first device (1001) may implement the function of the fourth component or may not essentially implement the function of the aforementioned fourth component. If the first device implements the function of the fourth component, the memory (1003) can be re-utilized for storing the modified object, or alternatively a separate memory (1006) can be provided for storing the modified object, as received from the second device (1002).

The second device (1002) includes a gesture recognizer device (1007), a gesture database (1008), a gesture action generation module (1009). The gesture action generation module (1009) receives an input from the gesture recognizer device (1007), and searches through the gesture database (1008) for a gesture action corresponding to the received input and provides the gesture action as its output. The output of the gesture action generation module (1009) is provided to a transceiver (1010), that is operably connected to the first device (1001) and to an object modification module (1011). More particularly, the selection command is provided to the transceiver (1010) to enable the same to obtain the selected object from the first device (1001) and the modification command is provided to the object modification module (1011) to enable the same to modify the received object.

The second device (1002) may further include a memory (1012) for storing the modified object on the second device (1002).

Typically, each of the first, second, third and fourth components can be realized by a device including one or more Central Processing Units (CPU) for executing instructions, and suitable size memory for storing the instructions. The memory includes both volatile memory and nonvolatile storage. The memory stores instructions, which when executed by one or more processing units, enable the corresponding component to achieve the desired functionality, as described above. The instructions can also be stored on media, such as a Compact Disc Read Only Memory (CDROM), digital versatile disc (DVD) or magnetic media, and can be provided to the devices for execution. Alternatively or additionally, some or all of the functions associated with each component may be implemented using dedicated or semicustom hardware circuits. The devices may operate as a standalone device or may be connected, e.g., using a network, to other computer systems or peripheral devices.

In a networked deployment, the device may operate in the capacity of a server or as a client subscriber computer in a server-client subscriber network environment, or as a peer computer in a peer-to-peer (or distributed) network environment. The device can also be implemented as, or incorporated into, various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, a switch or bridge, or any other machine capable of executing a set of instructions (sequentially or otherwise) that specify actions to be taken by that machine.

By way of example, the first component may include one or more of devices storing a plurality of objects, and a processor, e.g., a central processing unit (CPU), a graphics processing unit (GPU), application specific integrated circuits, field programmable gate arrays, servers, networks, digital circuits, analog circuits, or combinations thereof functioning as a selection module for selecting a particular object or a set of objects from the plurality of objects.

The second component may include a memory functioning as a gesture database, a camera functioning as a gesture recognizer device and a processor, e.g., a central processing unit (CPU), a graphics processing unit (GPU), application specific integrated circuits, field programmable gate arrays, servers, networks, digital circuits, analog circuits, or combinations thereof functioning as a gesture action generation module. Additionally, the second component may optionally include a gesture action transmitter for transmitting the gesture action to any other device.

The third component may include a processor, e.g., a central processing unit (CPU), a graphics processing unit (GPU), application specific integrated circuits, field programmable gate arrays, servers, networks, digital circuits, analog circuits, or combinations thereof functioning as an object modification module. By way of a non-limiting example, the third component can be a cloud server. The third component may include a transceiver as is conventionally available for the purposes of establishing a communication with the remaining devices.

The fourth component may include a memory configured to store the modified object and optionally a transceiver as is conventionally available for the purposes of establishing a communication with the remaining devices.

In the following paragraphs, examples of the interaction with multiple devices that enable the user to realize advanced functionalities are illustrated. It should be noted that the following examples are provided merely by way of illustration and are not be construed as limiting the scope.

Example 1: 3D Object Selection and in-Air Modification Via Finger Gestures

Figure 11:
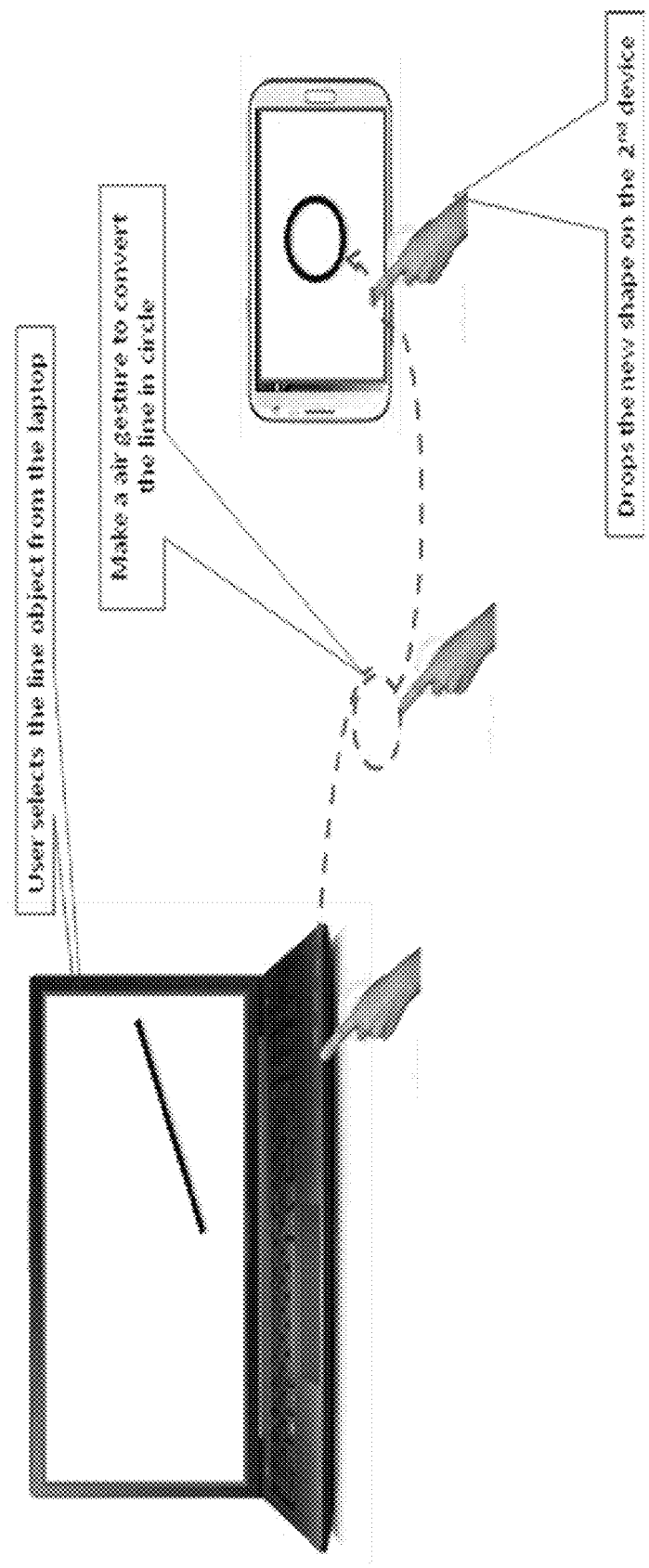
FIG. 11 illustrates 3D object selection and in-air modification via finger gestures according to an exemplary embodiment.

As illustrated in FIG. 11, a user can select an object on a first device, modify the same in-air using finger gestures, and drop the modified object on a second device. This can be used for any types of geometry, window, and graphics objects present on the first device.

Example 2: Folder Selection and in-Air Compression Via Hand Gestures

Figure 12:
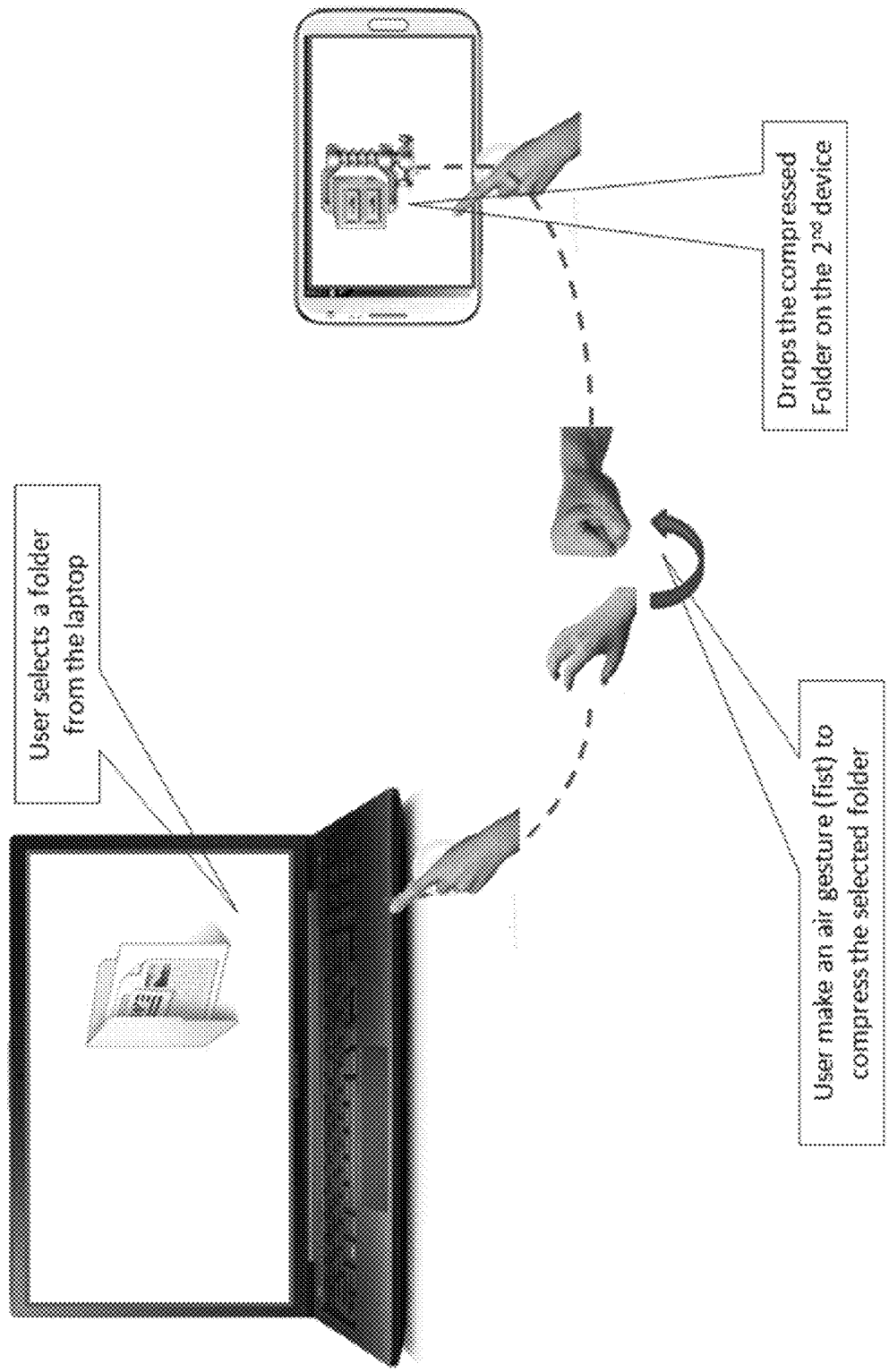
FIG. 12 illustrates folder selection and in-air compression via hand gestures according to an exemplary embodiment.

As illustrated in FIG. 12, a user can select files and folders on a first device, apply modifications, such as compression, decryption, using finger or hand gestures, and drop the resulting file or folder on a second device.

Figure 13:
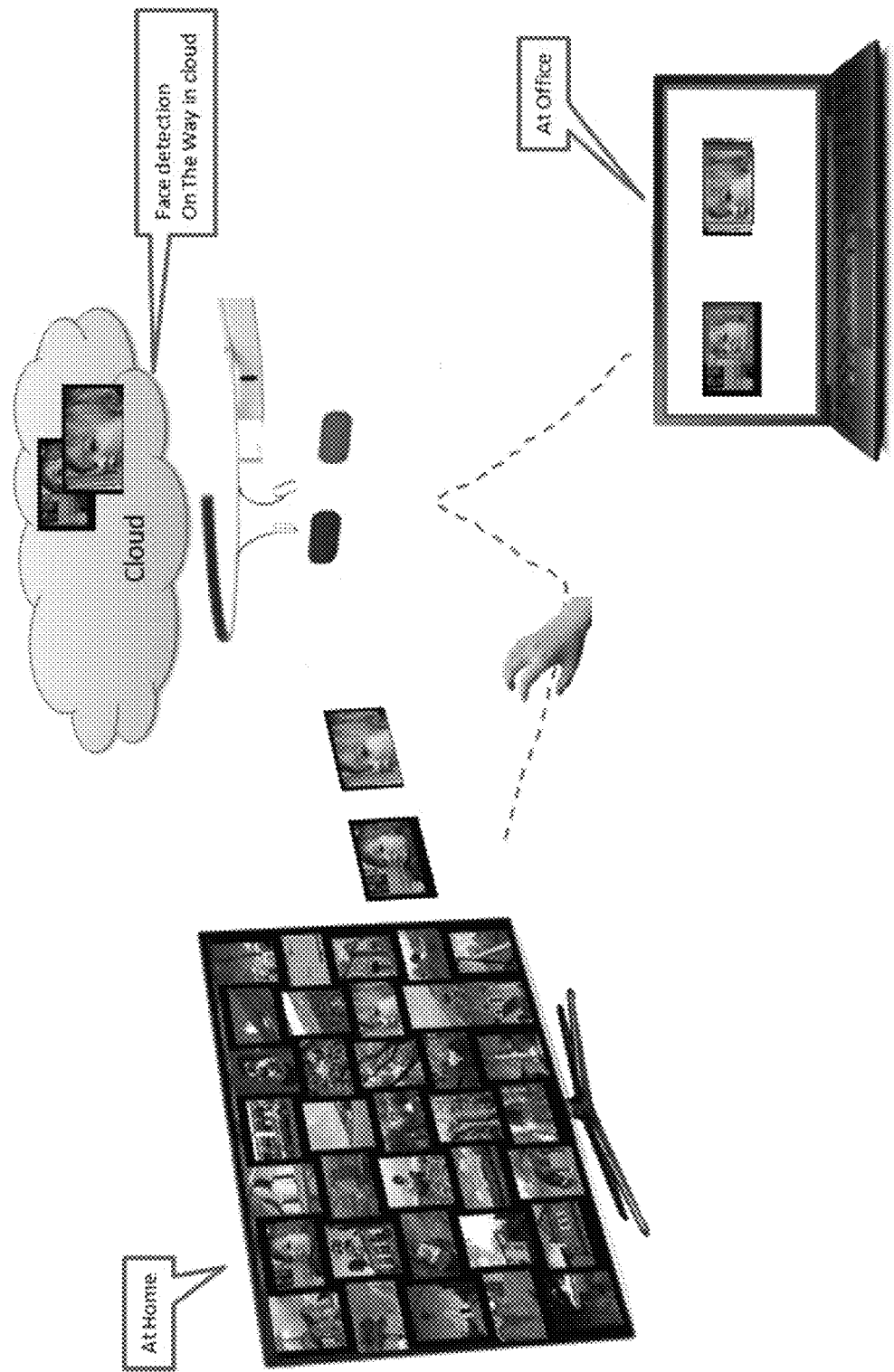
FIG. 13 illustrates picture collection and storage according to an exemplary embodiment.

Example 3: Picture Collection, Processing in Cloud and Storing Resulting Files on Personal Computer As illustrated in FIG. 13, a user can select various pictures or videos from a device, apply modifications, such as face detection or image processing, on the selected pictures or videos, using finger or hand gestures, and then drop the resulting pictures or videos on a second device via a cloud. In this case, the devices may be separated physically.

Example 4: Summary Collection from a Web Page Using Hand Gestures

Figure 14:
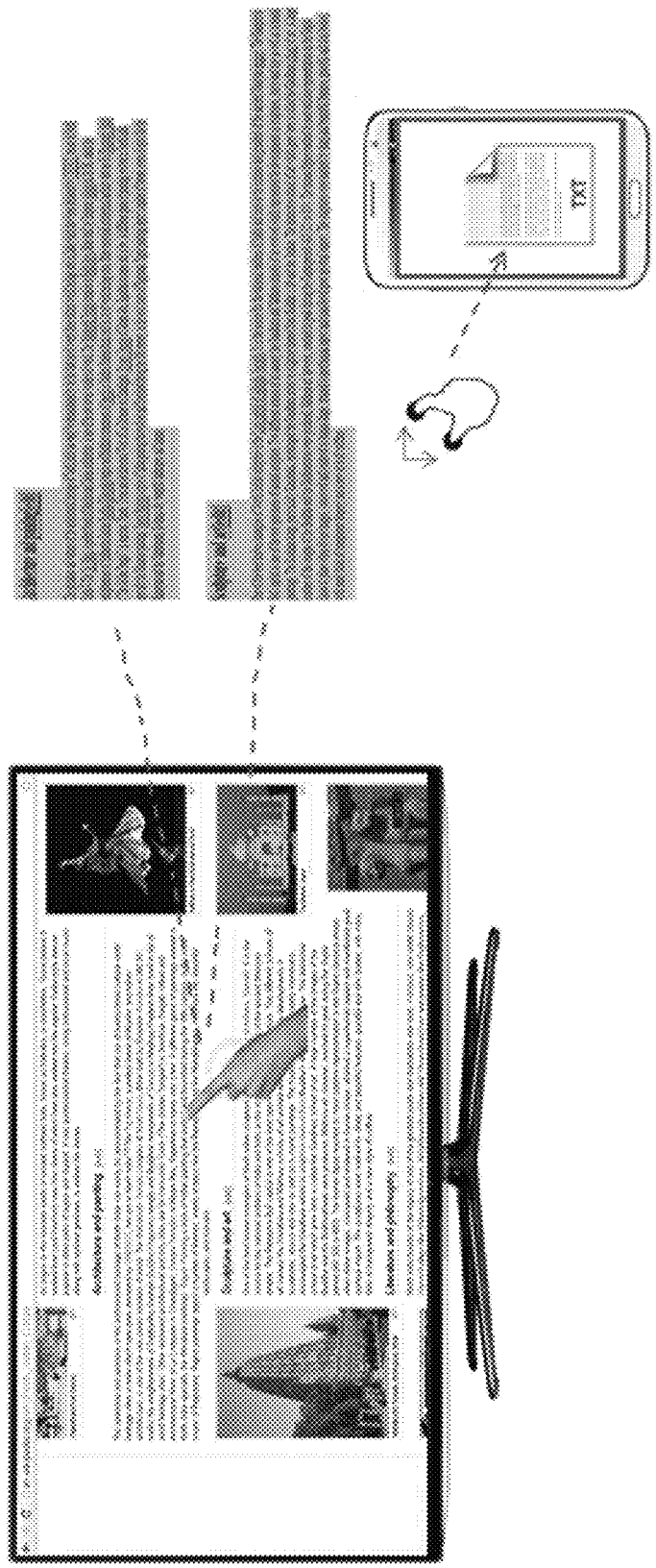
FIG. 14 illustrates collecting a summary from a web page using hand gestures according to an exemplary embodiment.

As illustrated in FIG. 14, a user can select various content, such as text, image, paragraph, video, from a webpage and modify the selected content to a text file, and then drop the same on a mobile phone as a text file.

Example 5: Capability Enhancement of an Existing Device Using Other Device

Figure 15:
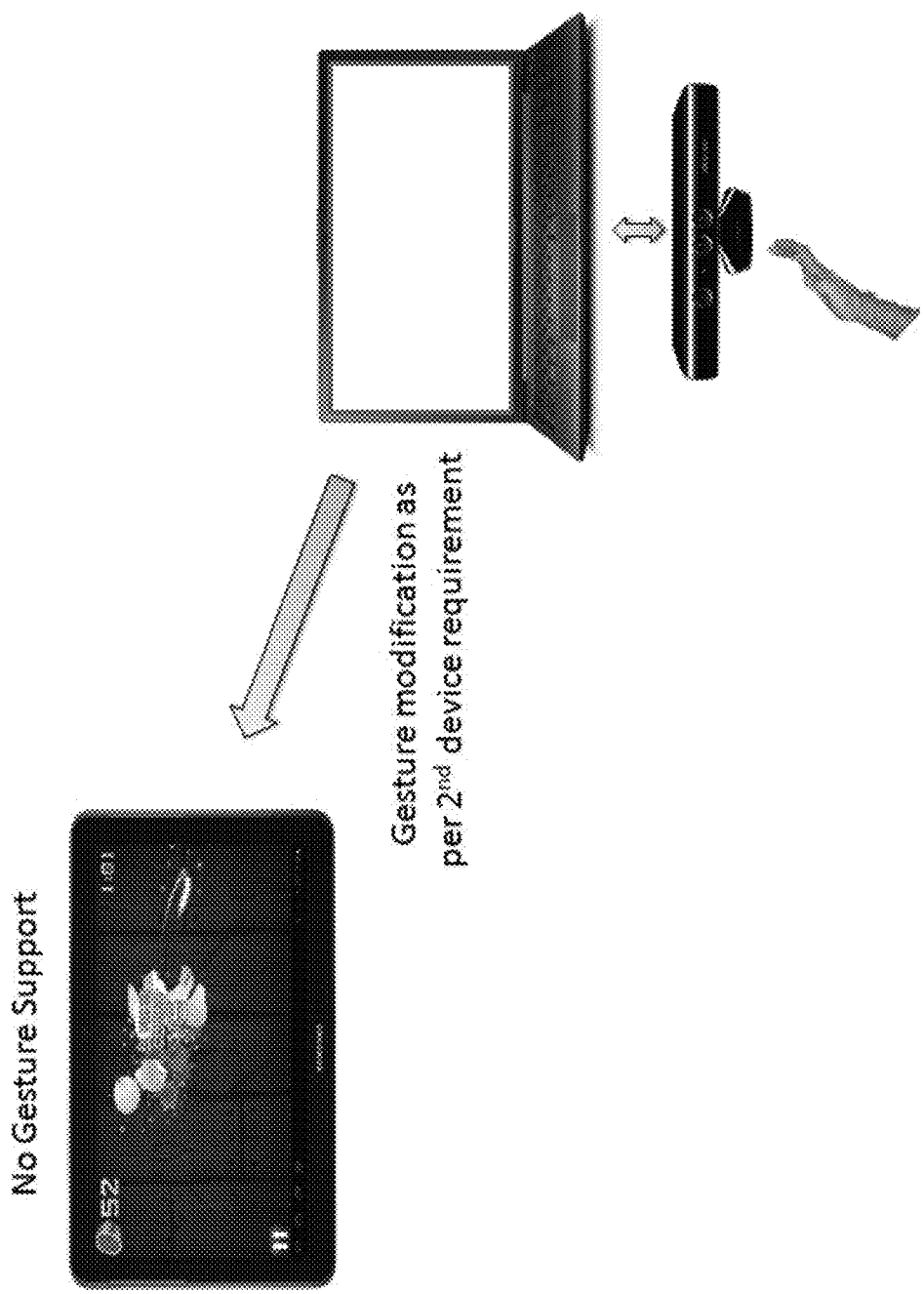
FIG. 15 illustrates capability enhancement of an existing device using another device according to an exemplary embodiment.

As illustrated in FIG. 15, a user can play games using a gesture on a first device that doesn't have gesture recognition using the capability from a second device after modifying the gestures according to the requirement of the first device.

Figure 16:
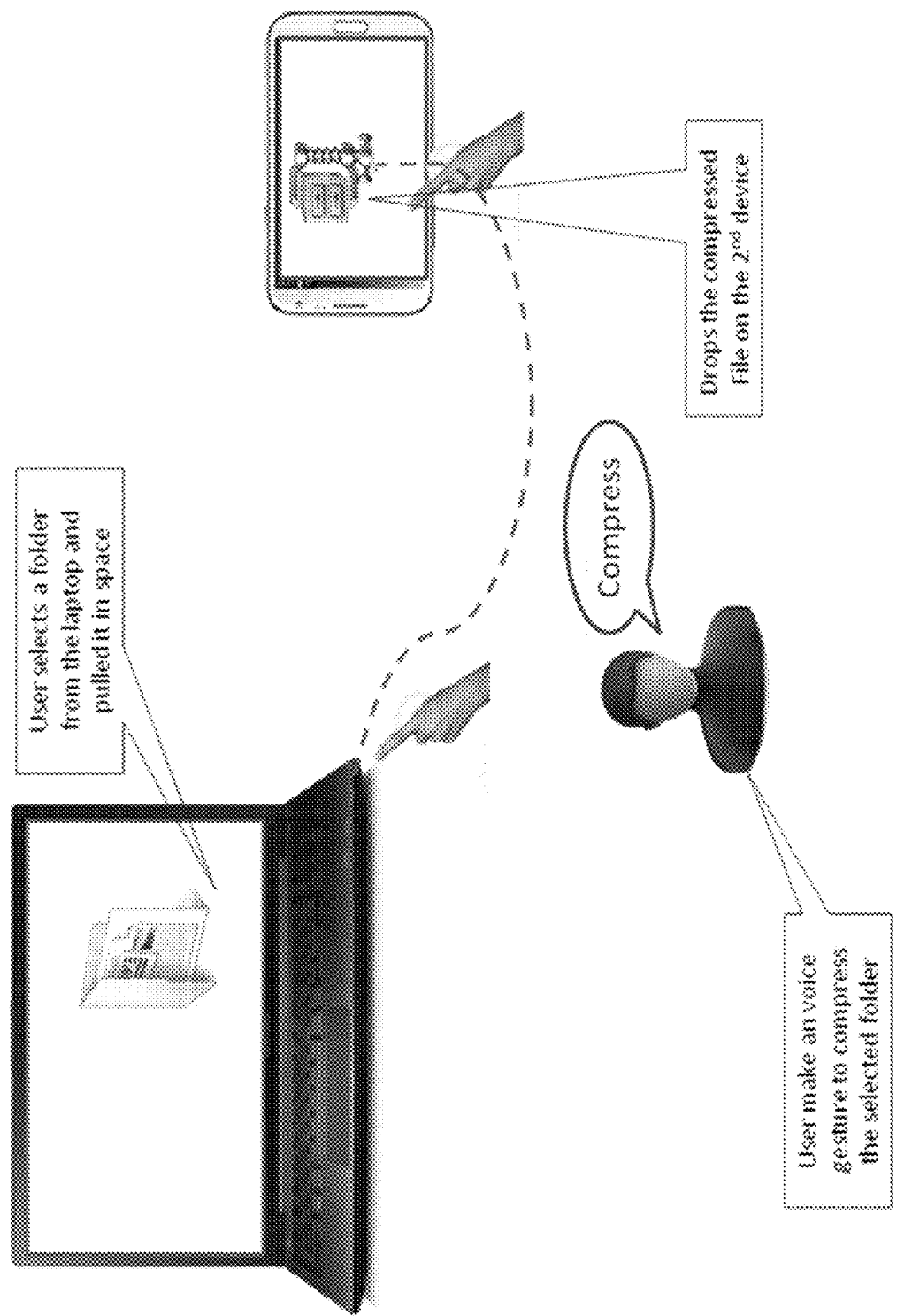
FIG. 16 illustrates folder selection and in-air compression via voice gestures or model gesture techniques according to an exemplary embodiment.

Example 6: Folder Selection and in-Air Compression Via Voice Gestures or Multi-Model Gesture Techniques As illustrated in FIG. 16, a user can select files and folders on a device, apply modifications like compression, decryption on them using, for example, voice, eye gaze, face expression gestures, and drop the resulting file or folder on a second device.

Example 7: Folder Selection and in-Device Compression Via Hand Gestures

Figure 17:
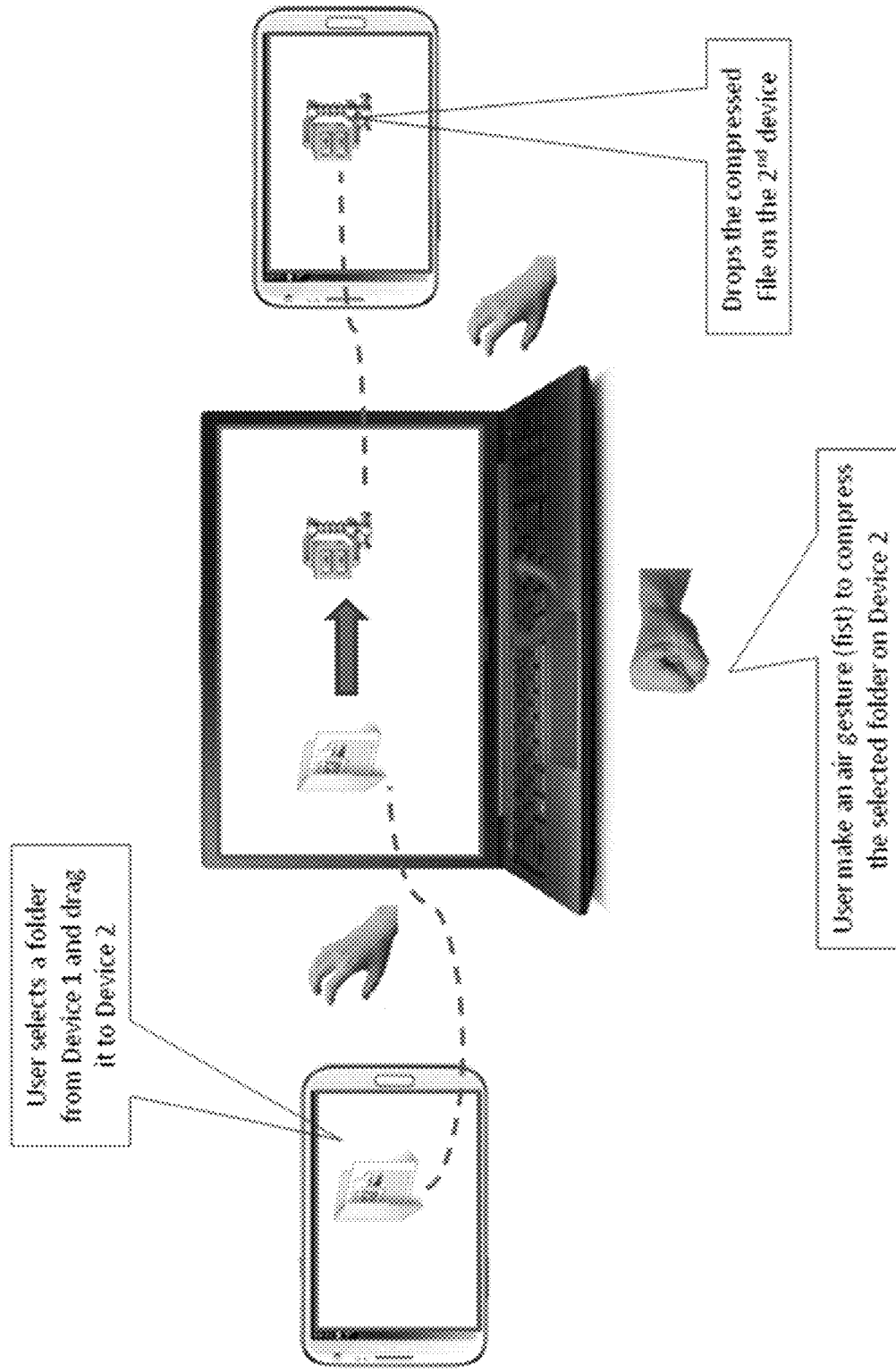
FIG. 17 illustrates folder selection and in-device compression via hand gestures.

As illustrated in FIG. 17, a user can select files and folders on a first device, drag content to a second deice, apply modifications, such as compression, decryption, on the selected files and folders using finger or hand gestures, and then drop the resulting file or folder on a third device.

It may be noted that the object that may be selected can be, for example:
  a. 3D object from a modeling tool
  b. Files and folders from a desktop
  c. Geometric shapes from a CAD designing tool
  d. Entire application running on a device However, it be noted that the objects mentioned above are merely by way of indication and objects other than what has been indicated above can also be chosen.

By way of example, some of the modifications that can be performed by using the method of the present disclosure include:

a. Object deformation (change in shape or size or orientation)
b. Change in object property (change in color, texture or other look and feel)
c. Change in object type (converting a file from one format to another format)
d. Merging multiple objects (compressing multiple objects)

Exemplary embodiments enable the user to interact with the device as defined above, thereby adding new dimensions to the human-computer-interaction (HCl) domain. The user is able to manipulate virtual objects in the way he manipulates real objects.

Exemplary devices include smart phones, tablets, PCs, televisions or any other device with recognition and processing capability. Here, the user will first select some object from the device. The object can be anything ranging from a file to a character. The object includes, but is not limited to, files, folders, images, videos, audio clips, database, text, string, 3D models, styles or anything else that can be selected from some application.

The selection is not limited to a single object. Multiple objects can be selected simultaneously or one-by-one. The selection is also not limited to any time limit. A user can operate on an object that was selected 10 days or a year ago. Also, the selection can be done in all possible ways supported by the device, such as selection by mouse, touch and gesture.

Once selected, the object information can be shared to an external server (residing on a separate machine) or on the same machine. The object information includes the object itself or metadata which can be used to identify the object. To perform some operation on the selected objects, the user has to perform some action, for example, via gestures. These gestures may be recorded by another device or the same device. This gesture recognition device can be any device that is also not required to be in proximity of the earlier devices.

While performing gesture based actions, the user can also select the previous selected objects via smart glasses or any other selection or pointing device. Other methods for selection include voice based selection of objects where the user will issue voice-commands on the mobile device.

Once the gesture is identified by the gesture recognizer device, the desired command may be applied to the selected one or more objects. The gesture can be used for modifying the properties of an object (color, size, shape, or other parameters) or it can be used to merge or split multiple objects. The device over which the operation will be performed can also be the same device from where the object was selected or on a target device. Once the modification has been applied, the object can be sent to a new device or to the original device. This can also be done via air gestures done in front of a gesture recognizer device.

Figure 18:
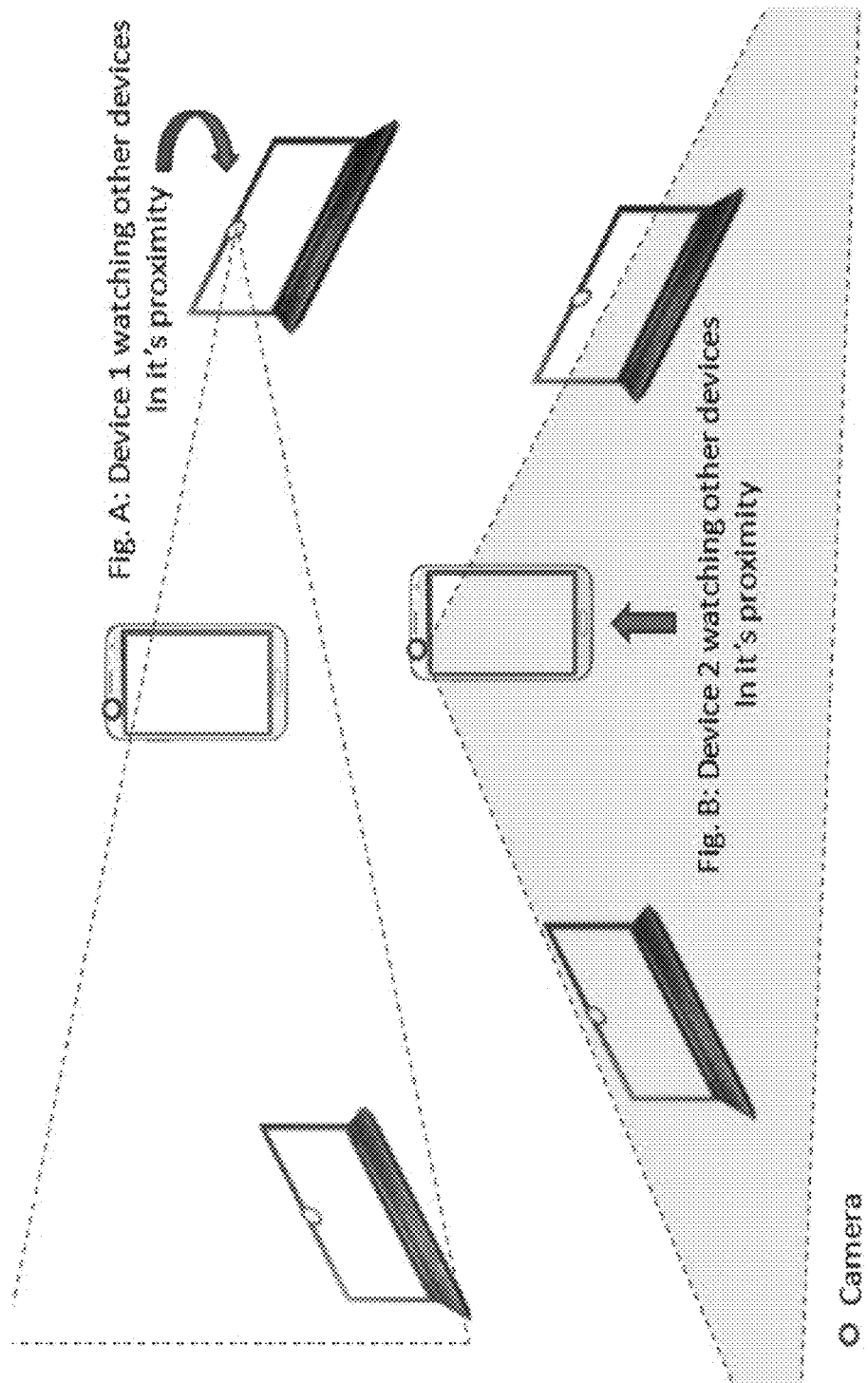
FIG. 18 illustrates exemplary arrangements of the plurality of devices in accordance with various exemplary embodiments.

If multiple devices having the capabilities of the second component are located in close proximity to each other (i.e., multiple devices having a camera are located close to each other), for example as shown in FIG. 18, then the devices can use proximity information and gesture position to verify if the gesture is applicable to the "Device A". by way of example, whenever an In-Air gesture is performed towards a device, e.g., "Device A", the "Device A" will use the proximity information and gesture position to verify if the gesture is applicable to the "Device A". If no other device is available in "Device A" proximity, the gesture will be applicable to the "Device A". If other devices are available in proximity, a voting can be done among the devices to find the best suitable device that will use the gesture command.

Referring to FIG. 18, because multiple devices having the capabilities of the second component are located in close proximity to each other (i.e., multiple devices having a camera are located close to each other) and because the interaction is based on in-air gestures, there is a high probability of:

(a) multiple devices detecting the command and trying to take simultaneous action, which results in conflicts; or
(b) despite multiple devices detecting the command, none taking the necessary action, on the belief that another device will take the necessary action.

It has been observed that if a Device of Interest (DOI) is selected or identified from the multiple devices, instances of the aforesaid types of erroneous operation can be substantially reduced. In this regard, a DOI can be selected from multiple devices by using the following ways:

1. Manual Selection: In this mode, the user will manually select the DOI before performing the gesture. The selection method can be done by physically activating the device or by voice activation. If no manual selection is done by user, the automation selection will be performed after receiving the gesture. By way of example, the manual selection may involve, as a first step, the user activating a particular device by calling a pre-defined name allocated to the device and subsequently performing some air gesture. If two different devices, such as a TV and a mobile, are placed near to each other, the user can first call "mobile" and thereafter perform the air gesture.

2. Automatic selection: In this mode, the device(s) themselves decide the DOI. If there is only one device available, it becomes the DOI. If there is any ambiguity in device selection due to availability of multiple devices, the devices themselves will identify the DOI based on a method that is described in detail below.

In accordance with an exemplary embodiment, the automatic selection is done by the device using the camera placed on every device. The devices begin with identifying the other devices placed in its vicinity with the help of this camera. After identification, a layout is made by every device about the neighboring devices.

When a gesture performed by user is seen by multiple devices present in the vicinity, the devices themselves identify the device of interest (DOI), wherein a device of interest is defined as the device with which the user most probably wants to interact. In accordance with aspects of exemplary embodiments, the device are by themselves able to identify the device of interest by considering various factors, such as:

a) User's position: The proximity of the user to any device will increase its probability of being DOI.
b) Gesture direction: The device present in the gesture direction has high probability of being the DOI.
c) Nature of gesture: The applicability of a gesture to any device will increase its probability of being the DOI. For example, a "zip this" gesture command to a printer will have less probability than a computational device, such as a computer, mobile device or table).

Based on the above factors, a device can be identified as the DOI. Once the DOI is identified, the gesture operation will be performed on this device.

While specific language has been used to describe exemplary embodiments, any limitations arising on account of the same are not intended. Further, as would be apparent to a person in the art, various modifications may be made in order to implement the present disclosure, as taught herein.

The drawings and the forgoing description of embodiments are exemplary. Those skilled in the art will appreciate that one or more of the described elements may well be combined into a single functional element. Alternatively, certain elements may be split into multiple functional elements. Elements from one exemplary embodiment may be added to another exemplary embodiment. For example, orders of processes described herein may be changed and are not limited to the manner described herein. Moreover, the actions illustrated in any flow diagram need not be implemented in the order shown; nor do all of the acts necessarily need to be performed. Also, those acts that are not dependent on other acts may be performed in parallel with the other acts. The scope of exemplary embodiments is by no means limited by these specific examples. Numerous variations, whether explicitly given in the specification or not, such as differences in structure, dimension, and use of material, are possible. The scope of exemplary embodiments is at least as broad as given by the following claims.

What is claimed is:

1. A method of controlling a first terminal to provide a modified object, the method comprising:
   detecting a first gesture to select at least one object;
   in response to detecting a second gesture to modify an object from among the at least one selected object, modifying the object corresponding to the second gesture;
   in response to detecting a third gesture to transmit the modified object, identifying a second terminal from among a plurality of second terminals based on a direction of the third gesture, and a relationship between a function of the second terminal and a command corresponding to the third gesture; and
   transmitting the modified object to the identified second terminal based on the third gesture.

2. The method as claimed in claim 1, wherein the detecting the first gesture, the detecting the second gesture and the detecting the third gesture are performed by the first terminal.

3. The method as claimed in claim 1, further comprising:
   transmitting a command corresponding to the second gesture, an identifier of the second terminal, and the selected object to a third terminal based on the third gesture;
   modifying the selected object in the third terminal according to the command corresponding to the second gesture;
   transmitting the modified object from the third terminal to the second terminal; and
   providing the modified object on the second terminal.

4. The method as claimed in claim 1, wherein the second gesture is an air gesture that corresponds to a modification.

5. The method as claimed in claim 1, further comprising:
   selecting a folder based on the first gesture indicating the folder on the first terminal being detected;
   compressing the folder; and
   transmitting a compressed file comprising the folder to the second terminal.

6. The method as claimed in claim 1, further comprising:
   selecting a content on the first terminal corresponding to the object based on the first gesture,
   transmitting the selected content to a third terminal and an identifier of the second terminal based on the third gesture to transmit the content;
   detecting a figure in the content on the third terminal;
   transmitting the content from which the figure is detected from the third terminal to the second terminal; and
   displaying the content including the detected figure on the second terminal.

7. The method as claimed in claim 1, further comprising:
   selecting a letter displayed on the first terminal corresponding to the first gesture;
   converting the letter into text data; and
   transmitting the text data to the second terminal so that the text data may be displayed on the second terminal.

8. The method as claimed in claim 1, wherein the selected object is a file in a first file type, and
   wherein the second command controls the second terminal to convert the file from the first file type to a second file type.

9. A method of controlling a second terminal to provide a modified object, the method comprising:
   detecting, by a camera included in the second terminal, an air gesture command comprising a first gesture to select at least one object displayed by a first terminal and a second gesture to modify an object from among the at least one object;
   identifying the first terminal from among a plurality of first terminals based on a direction of the first gesture, and a relationship between the air gesture command and a function of the first terminal;
   transmitting a request to the first terminal to request the selected object;
   receiving the selected object;
   modifying the object corresponding to the second gesture; and
   providing the modified object on the second terminal.

10. A system comprising:
    a first terminal configured to provide an object and detect a selection command for selecting at least one object;
    a plurality of second terminals, each of the plurality of second terminals comprising a camera and being configured to recognize a user gesture using the camera; and
    a third terminal configured to receive the at least one object from the first terminal and the recognized user gesture from each of the plurality of second terminals, modify a first object corresponding to the recognized user gesture from among the at least one object according to the recognized user gesture, identify a second terminal from among the plurality of second terminals based on a direction of the recognized user gesture, a relationship between a command corresponding to the recognized user gesture and a function of the second terminal, and provide the modified first object to the second terminal.

11. The system as claimed in claim 10, wherein the first terminal is configured to store a plurality of objects and select the at least one object from among the plurality of stored objects based on the detected selection command.

12. The system as claimed in claim 10, wherein each of the plurality of second terminals is configured to transmit the recognized user gesture to at least one of the third terminal and the first terminal.

13. The system as claimed in claim 10, wherein the first terminal comprises the second terminal.

14. The system as claimed in claim 10, wherein the third terminal comprises a display device, and
    wherein the display device is configured to display the object.

15. The system as claimed in claim 14, wherein the first terminal comprises a second display device, wherein the first terminal is configured to display a folder on the second display device, and transmit the folder to a cloud server based on the selection command indicating the folder, wherein the cloud server is configured to generate a compressed file by compressing the folder, and transmit the generated compressed file to the third terminal, and wherein the display device is configured to provide the generated compressed file.

16. The system as claimed in claim 14, wherein the first terminal is configured to store a content, and transmit the content to a cloud server based on the selection command indicating the content, wherein the cloud server is configured to detect a figure from the content and transmit the content and the figure to the display device, and wherein the display device is configured to display the content and the figure.

17. The system as claimed in claim 10, wherein the first terminal comprises a display, wherein the display is configured to display a folder, wherein based on detection of a gesture selecting the folder, the first terminal is configured to compress the folder to a compressed file and transmit the compressed file to the third terminal, and wherein the third terminal is configured to provide the compressed file.

18. The system as claimed in claim 10, wherein the third terminal comprises a display device, wherein the first terminal is configured to store a content, detect a figure included in the content based on the selection command indicating the content, and transmit the content and the figure to the third terminal, and wherein the display device is configured to display the content including the figure.

19. The system as claimed in claim 10, wherein the first terminal comprises a first display device and the third terminal comprises a second display device, wherein the first terminal is configured to display a letter on the first display device, convert the letter into a text file in response to the letter being selected, and transmit the text file to the third terminal, and wherein the third terminal is configured to display text data of the text file on the second display device.

20. A device for providing a modified object to an external device, the device comprising:

a display configured to display a user interface;

a camera configured to recognize a selection gesture indicating a portion of the user interface corresponding to at least one object and a modification gesture indicating a desired modification to an object from among the at least one object;

a transceiver configured to communicate with a first external device and a second external device; and a controller configured to select, based on first proximity information corresponding to the first external device, second proximity information corresponding to the second external device, a function corresponding to the modification gesture, a function of the first external device, and a function of the second external device, an external device from among the first external device and the second external device, modify the object corresponding to the desired modification and control the transceiver to transmit the modified object to the selected external device.

21. A device for providing a modified object received from an external device, the device comprising:

a display configured to display a user interface;

a camera configured to recognize a selection gesture selecting at least one object displayed on the external device as a selected object and a modification gesture indicating a desired modification to an object from among the at least one object;

a transceiver configured to communicate with the external device; and a controller configured to identify the external device from among a plurality of external devices based on a direction of the selection gesture, a relationship between a function corresponding to the modification gesture and a function of the external device, control the transceiver to transmit a request to the external device requesting the object and to receive the requested object, and modify the object corresponding to the desired modification in accordance with the desired modification.

22. A method of interacting with a first device and a second device across a cloud computing system, the method comprising:

displaying a first graphic user interface comprising a plurality of selectable objects on a first display of the first device;

detecting a selection gesture to select one or more of the plurality of selectable objects, the selection gesture detected by an imaging device of the first device;

detecting a modification gesture indicating one or more desired modifications to one or more objects from among the selected one or more objects by the imaging device of the first device;

detecting a transmission gesture indicating the second device;

identifying the second device from among a plurality of second terminals based on a direction of the transmission gesture, a relationship between a function corresponding to the modification gesture and a function of the second device;

transmitting the one or more objects corresponding to the modification gesture an identifier of the second device, and the one or more desired modifications from the first device to the cloud computing system;

receiving the one or more objects corresponding to the modification gesture and the one or more desired modification from the first device at the cloud computing system;

on the cloud computing system, modifying the one or more objects corresponding to the modification gesture in accordance with the one or more desired modifications;

transmitting the one or more modified objects from the cloud computing system to the second device;

receiving the one or more modified objects from the cloud computing system on the second device; and displaying a second graphic user interface comprising the one or more modified objects on a second display of the second device.

* * * * *